US009748579B2

(12) United States Patent
Marlin et al.

(10) Patent No.: US 9,748,579 B2
(45) Date of Patent: Aug. 29, 2017

(54) METHOD OF FABRICATING AN LTM PEROVSKITE PRODUCT

(71) Applicant: SAINT-GOBAIN CENTRE DE RECHERCHES ET D'ETUDES EUROPEEN, Courbevoie (FR)

(72) Inventors: Samuel Marlin, Plan d'Orgon (FR); Caroline Levy, Montpellier (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 0 days.

(21) Appl. No.: 14/263,741

(22) Filed: Apr. 28, 2014

(65) Prior Publication Data

US 2014/0227633 A1 Aug. 14, 2014

Related U.S. Application Data

(62) Division of application No. 12/447,012, filed as application No. PCT/FR2007/052235 on Oct. 24, 2007, now abandoned.

(30) Foreign Application Priority Data

Oct. 24, 2006 (FR) ................... 06 54481
Oct. 24, 2006 (FR) ................... 06 54482
Feb. 27, 2007 (FR) ................... 07 53541

(51) Int. Cl.
*C04B 35/01* (2006.01)
*H01M 4/90* (2006.01)
*C01G 45/12* (2006.01)
*C04B 35/626* (2006.01)
*C04B 35/653* (2006.01)
*H01M 4/86* (2006.01)
*H01M 8/124* (2016.01)

(52) U.S. Cl.
CPC ...... *H01M 4/9033* (2013.01); *C01G 45/1264* (2013.01); *C04B 35/016* (2013.01); *C04B 35/62665* (2013.01); *C04B 35/653* (2013.01); *C01P 2002/34* (2013.01); *C04B 2235/3206* (2013.01); *C04B 2235/3208* (2013.01); *C04B 2235/3213* (2013.01); *C04B 2235/3215* (2013.01); *C04B 2235/3224* (2013.01); *C04B 2235/3225* (2013.01); *C04B 2235/3227* (2013.01); *C04B 2235/3229* (2013.01); *C04B 2235/528* (2013.01); *C04B 2235/5296* (2013.01); *C04B 2235/5427* (2013.01); *C04B 2235/5436* (2013.01); *C04B 2235/6567* (2013.01); *C04B 2235/72* (2013.01); *C04B 2235/768* (2013.01); *H01M 2004/8689* (2013.01); *H01M 2008/1293* (2013.01); *Y10T 428/2982* (2015.01)

(58) Field of Classification Search
CPC ............... C04B 35/016; C04B 35/653; C04B 35/62665; C04B 2235/678; C01G 45/1264
See application file for complete search history.

(56) References Cited

U.S. PATENT DOCUMENTS

| 3,343,593 | A | 9/1967 | Goton et al. |
| 3,993,119 | A | 11/1976 | Scott |
| 5,411,767 | A | 5/1995 | Soma et al. |
| 5,418,081 | A | 5/1995 | Kawasaki et al. |
| 5,453,330 | A | 9/1995 | Kawasaki et al. |
| 6,537,689 | B2 | 3/2003 | Schoop et al. |
| 2005/0244693 | A1* | 11/2005 | Strutt .................. H01M 4/8621 429/480 |
| 2008/0038555 | A1* | 2/2008 | Sekine .................... B22F 9/002 428/402 |
| 2009/0087697 | A1 | 4/2009 | Ramanathan et al. |

FOREIGN PATENT DOCUMENTS

| AT | DE 102004001346 | * 7/2004 | ................ B01J 2/04 |
| EP | 0 732 430 A2 | 9/1996 | |
| FR | 1.208.577 | 2/1960 | |
| FR | 1.430.962 | 1/1966 | |

OTHER PUBLICATIONS

DE 10 2004 001346 (Bauckhage) Jul. 2, 2004 (English language machine translation). [online] [retrieved Jun. 30, 2016]. Retrieved from: Espacenet.*
Kalpakjian. Manufacturing Processes for Engineering Materials. Upper Saddle River, NJ, Pearson Education, Inc., 2003. p. 207.*
Li et al., "Effect of spray parameters on the electrical conductivity of plasma-sprayed $La_{1-x}Sr_xMnO_3$ coating for the cathode of SOFCs," *Surface & Coatings Technology*, 2005, vol. 198 pp. 278-282.
Ming et al., "A new route to synthesize $La_{1-x}Sr_xMnO_3$," *Journal of Materials Science*, 2000, vol. 35, pp. 3599-3606.
Bouchard et al., Synthesis and Characterization of $La_{0.8}Sr_{0.2}MO_{3-\delta}$ (M=Mn, Fe, or Co) Cathode Materials by Induction Plasma Technology, *Journal of Thermal Spray Technology*, 2006, vol. 15, No. 1, pp. 37-45.
Syskakis et al., "Structural and high temperature electrical properties of $La_{y-x}Sr_xMnO_3$ perovskite materials," *Journal de Physique IV*, 1993, vol. 3, pp. 1429-1434.
Syskasis et al., "Properties of perovskite powders and ceramics for solid oxide fuel cell application," *Mater. Powder Technol.*, 1993, pp. 707-712.
Michalopoulou et al., "Calorimetric and electrical transport properties of stoichiometric $La_{1-x}Sr_xMnO_3$ compounds," *Journal of Physics: Condensed Matter*, 2003, vol. 15, pp. 7763-7776.
Bell et al., "Influence of synthesis route on the catalytic properties of $La_{1-x}xSr_xMnO_3$," *Solid State Ionics*, 2000, vol. 131, pp. 211-220.

(Continued)

*Primary Examiner* — Erin Snelting
(74) *Attorney, Agent, or Firm* — Oliff PLC

(57) ABSTRACT

The present invention provides a fused product comprising LTM perovskite, L designating lanthanum, T being an element selected from strontium, calcium, magnesium, barium, yttrium, ytterbium, cerium, and mixtures of these elements, and M designating manganese.

52 Claims, No Drawings

(56) References Cited

OTHER PUBLICATIONS

Monty et al., "Nanomaterials: New elaboration processes using solar furnaces," *Materials Science Forum*, 1998, vols. 269-272, pp. 297-302.
Ovenstone et al.; *J. Mat. Science*; 2000; pp. 4115-4119; vol. 35.
Criger; *Material Science and Engineering*; 2001.
Saracco et al.; *Applied Catalyst B: Environmental 20*; 1999; pp. 277-288.

* cited by examiner

METHOD OF FABRICATING AN LTM PEROVSKITE PRODUCT

This application is a divisional application of U.S. patent application Ser. No. 12/447,012, filed on Jul. 16, 2009, which is a national stage entry of PCT/FR2007/052235 filed on Oct. 24, 2007, which claims priority to FR 0753541 filed Feb. 27, 2007, FR 0654482 filed Oct. 24, 2006 and FR 0654481 filed Oct. 24, 2006, the disclosures of each of which are hereby incorporated by reference.

BACKGROUND

The invention relates to a new method of fabricating a lanthanum-strontium-manganese (LSM) perovskite.

The term perovskite is conventionally used to designate any substance presenting a structure of the $ABO_3$ type.

A lanthanum-strontium-manganese (LSM) perovskite is a compound in which A is strontium-doped lanthanum and B is manganese. Its structure is of the following type:

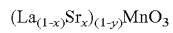

$(La_{1-x}Sr_x)_{(1-y)}MnO_3$

The lanthanum-strontium-manganese perovskite powders presently available on the market are used in particular in the fabrication of solid oxide fuel cell (SOFC) cathodes. They are generally fabricated by the following methods:
- sol-gel/co-precipitation;
- synthesis by solid sintering, e.g. as described in U.S. Pat. No. 5,453,330; and
- synthesis from precursors and pyrolysis.

An evaporation-condensation method is also described in the document "Nanomaterials: new elaboration processes using solar furnaces", Materials Science Forum, Vols. 269-272 (1998), pp. 297-302.

The article "Influence of synthesis route on the catalytic properties of $La_{1-x}Sr_xMnO_3$", Solid State Ionics 131 (2000), 211-220 by Robert J. Bell, Graeme J. Miller, and John Drennan, also describes six methods of synthesizing lanthanum-strontium-manganese perovskite powders.

All of the powders obtained using the above-described methods present mean grain sizes that are quite small (submicronic) to medium (about 5 micrometers μm). They are expensive.

Methods are also known for fabricating single crystal lanthanum-strontium-manganese perovskite, e.g. from EP 0 732 430. Those methods are nevertheless expensive.

The article "Effect of spray parameters on the electrical conductivity of plasma-sprayed $La_{1-x}Sr_xMnO_3$ coating for the cathode of SOFCs" describes a coating obtained by plasma spraying. As stated on page 279, such a coating presents a lamellar structure that is not presented by a fused and cast product.

BRIEF SUMMARY

There thus exists a need for a novel method enabling lanthanum-strontium-manganese perovskite to be fabricated at reduced cost and in industrial quantities.

The object of the invention is to satisfy this need.

According to the invention, this object is achieved by means of a method of fabricating lanthanum-strontium-manganese perovskite, the method comprising the following steps:
a) mixing raw materials to form a starting charge;
b) fusing the starting charge to obtain a molten liquid; and
c) solidifying the molten liquid to form a solid material;

the raw materials being selected in such a manner that the solid material obtained in step c), referred to as a "fused material", presents the following chemical composition in percentages by weight for a total of 100%:
  36%<lanthanum expressed in the form $La_2O_3$<70.7%;
  0%<strontium expressed in the form of SrO<25.8%;
  29.3%<manganese expressed in the form MnO<41.2%; and
  impurities<0.7%.

The material may be in the form of a block or a particle.

DETAILED DESCRIPTION

In a first embodiment, the method thus provides a method of fabricating particles comprising lanthanum-strontium-manganese perovskite, the method comprising the following steps:
$a_1$) mixing raw materials to form a starting charge;
$b_1$) fusing the starting charge to obtain a molten liquid;
$c_1$) dispersing the molten liquid in the form of liquid droplets; and
$d_1$) solidifying the liquid droplets by contact with an oxygenated fluid.

According to the invention, in step $a_1$), the raw materials are selected in such a manner that the solid particles obtained in step $d_1$), referred to as "fused particles", present the following chemical composition, in percentages by weight and for a total of 100%:
  36%<lanthanum expressed in the form $La_2O_3$<70.7%;
  0%<strontium expressed in the form of SrO<25.8%;
  29.3%<manganese expressed in the form MnO<41.2%; and
  impurities<0.7%.

In a second embodiment, the invention provides a method of fabricating a block comprising lanthanum-strontium-manganese perovskite, the method comprising the following successive steps:
$a_2$) mixing raw materials to form a starting charge;
$b_2$) fusing the starting charge to obtain a molten liquid;
$c_2$) casting the molten liquid into a mold;
$d_2$) solidifying the cast liquid in the mold by cooling until a block that is at least partially solidified is obtained; and
$e_2$) unmolding the block.

According to the invention, in step $a_2$), the raw materials are selected in such a manner that the unmolded block presents the following chemical composition, in percentages by weight for a total of 100%:
  36%<lanthanum expressed in the form $La_2O_3$<70.7%;
  0%<strontium expressed in the form of SrO<25.8%;
  29.3%<manganese expressed in the form MnO<41.2%; and
  impurities<0.7%.

The steps of the method of the invention are conventional for fabricating fused particles or fused blocks, and the person skilled in the art knows how to determine the raw materials in such a manner as to obtain said chemical composition in said fused particles or said fused blocks, this composition being identical to that of the lanthanum-strontium-manganese perovskite $(La_{1-x}Sr_x)_{1-y}MnO_3$ in which 0<x≤0.5 and −0.05≤y≤0.24. Nevertheless, the inventors were surprised to discover that such conventional steps led to a high percentage of perovskite phase.

Merely by adapting the composition of the starting charge, conventional methods, in particular methods implementing blowing or atomizing for making particles, thus make it possible, from a molten liquid, to fabricate particles or blocks of different sizes presenting a percentage of lanthanum-strontium-manganese perovskite, ignoring impurities, that is greater than 50%, preferably greater than 70%, preferably greater than 90%, more preferably greater than 99%, still more preferably greater than 99.9%. (The definition of the percentage of lanthanum-strontium-manganese perovskite in a product is given below in the present description.) This particularly surprising discovery goes against technical prejudices which, until now, have caused the person skilled in the art to be interested only in the complex and expensive methods that are mentioned above.

Preferably, the fabrication method of the first and second embodiments of the invention further includes one and preferably more of the following optional characteristics:

The starting charge is determined in such a manner that the chemical analysis of the fabricated particles or block is as follows, in percentages by weight and for a total of 100%:
38.4%<lanthanum expressed in the form $La_2O_3$<69.7%;
0%<strontium expressed in the form SrO<25.4%;
30.3%<manganese expressed in the form of MnO<37.2%; and
impurities<0.7%.

This composition is identical to that of the lanthanum-strontium-manganese perovskite $(La_{1-x}Sr_x)_{1-y}MnO_3$ with $0<x\leq0.5$ and $0\leq y\leq0.1$.

The starting charge is determined in such a manner that the chemical analysis of the fabricated particles or block is as follows, in percentages by weight and for a total of 100%:
47.9%<lanthanum expressed in the form $La_2O_3$<69.7%;
0%<strontium expressed in the form SrO<17%;
30.3%<manganese expressed in the form of MnO<35.7%; and
impurities<0.7%.

This composition is identical to that of the lanthanum-strontium-manganese perovskite $(La_{1-x}Sr_x)_{1-y}MnO_3$ with $0<x\leq0.35$ and $0\leq y\leq0.1$.

The starting charge is determined in such a manner that the chemical analysis of the fabricated particles or block is as follows, in percentages by weight and for a total of 100%:
47.9%<lanthanum expressed in the form $La_2O_3$<61.6%
6.7%<strontium expressed in the form SrO<17%;
31.5%<manganese expressed in the form of MnO<35.7%; and
impurities<0.7%.

This composition is identical to that of the lanthanum-strontium-manganese perovskite $(La_{1-x}Sr_x)_{1-y}MnO_3$ with $0.15<x\leq0.35$ and $0\leq y\leq0.1$.

The starting charge is determined in such a manner that the chemical analysis of the fabricated particles or block is as follows, in percentages by weight and for a total of 100%:
53.9%<lanthanum expressed in the form $La_2O_3$<61.6%;
6.7%<strontium expressed in the form SrO<11.8%;
31.5%<manganese expressed in the form of MnO<34.7%; and impurities<0.7%.

This composition is identical to that of the lanthanum-strontium-manganese perovskite $(La_{1-x}Sr_x)_{1-y}MnO_3$ with $0.15<x\leq0.25$ and $0\leq y\leq0.1$.

Preferably, the percentage by weight of "lanthanum expressed in the form of $La_2O_3$" is greater than 38.4%, preferably greater than 47.9%, more preferably greater than 53.9%, and/or less than 69.7%, preferably less than 61.6%.

Preferably, the percentage by weight of "strontium expressed in the form of SrO" is greater than 0.8%, preferably greater than 6.7%, and/or less than 25.4%, preferably less than 17%, more preferably less than 11.8%.

Preferably, the percentage by weight of "manganese expressed in the form of MnO" is greater than 30.3%, preferably greater than 31.5%, and/or less than 37.2%, preferably less than 35.7%, more preferably less than 34.7%.

Preferably, the fabrication method of the first embodiment of the invention further comprises one and preferably more of the following optional characteristics:
in step $b_1$), an arc furnace is used;
in step $c_1$), said molten liquid is put into contact with an oxygenated fluid, preferably identical to that used in step $d_1$);
the dispersion and solidification steps are simultaneous;
contact between the droplets and an oxygenated fluid is maintained until said droplets have solidified completely;
the oxygenated fluid in step $c_1$) and/or in step $d_1$), preferably air, contains at least 20%, or even at least 25%, by volume of oxygen; and
after step $d_1$), the fused particles are annealed. Preferably, the particles are annealed at a temperature lying in the range 1050° C. to 1400° C., preferably 1150° C., with a soak at that temperature of at least 30 minutes, preferably of more than 2 hours, preferably of about 5 hours. More preferably, the particles are annealed under an atmosphere containing at least 20% by volume of oxygen, preferably under air, preferably at atmospheric pressure.

Preferably, the fabrication method of the second embodiment of the invention further comprises one and preferably more of the following optional characteristics:
in step $b_2$), an induction furnace is used;
in step $c_2$) and/or in step $d_2$) and/or after step $e_2$), the molten liquid that is solidifying is put directly or indirectly into contact with an oxygenated fluid, preferably an oxygenated gas, e.g. with air. Preferably, said contact is initiated immediately after the block has been unmolded. More preferably, this contact is maintained until the block has solidified completely;
the rate of cooling during solidification is always less than 1000 kelvins per second (K/s), preferably less than 100 K/s, more preferably less than 50 K/s;
the unmolding of step $e_2$) is performed before the block has solidified completely;
preferably, the block is unmolded as quickly as possible, preferably as soon as it presents sufficient rigidity to conserve its shape substantially, and more preferably, the block is then put immediately into contact with the oxygenated fluid;
after step $e_2$), the unmolded block is annealed. The block is preferably annealed at a temperature lying in the range 1050° C. to 1400° C., preferably at 1150° C., with a soak at that temperature measured from the moment when the entire block has reached the soak temperature (on the surface of the block and in the core of the block), the duration of the soak being preferably greater than 30 minutes, preferably greater than 2 hours, and preferably about 5 hours. More preferably, the block is annealed under an atmosphere containing at least 20% by volume of oxygen, preferably under air, preferably at atmospheric pressure;
the unmolded block, optionally after annealing, is broken into pieces or into a powder, e.g. by crushing and/or grinding. Grain size is then preferably selected as a function of the intended application.

The invention also provides a fused product in the form of a fused particle or a fused block having a percentage of lanthanum-strontium-manganese perovskite ignoring impurities that is greater than 50%, preferably greater than 70%, more preferably greater than 90%, still more preferably greater than 99%, the product presenting the following chemical composition, in percentages by weight and for a total of 100%:

36%<lanthanum expressed in the form $La_2O_3$<70.7%;
0%<strontium expressed in the form of SrO<25.8%;
29.3%<manganese expressed in the form MnO<41.2%; and
impurities<0.7%.

Preferably, this product presents, ignoring impurities, a percentage of said lanthanum-strontium-manganese perovskite of formula $(La_{1-x}Sr_x)_{1-y}MnO_3$ in which $0<x\leq 0.5$ and $-0.05\leq y\leq 0.24$, that is greater than 99.9%, with the parameters $\underline{x}$ and $\underline{y}$ in the formula being atom proportions for each element.

Preferably, the product of the invention includes one, and preferably more than one, of the following optional characteristics:

The product of the invention is obtained or can be obtained using a method in accordance with the invention.

The product of the invention presents a percentage by weight of "lanthanum expressed in the form of $La_2O_3$" that is greater than 38.4%, preferably greater than 47.9%, more preferably greater than 53.9%, and/or less than 69.7%, preferably less than 61.6%.

The product of the invention presents a percentage by weight of "strontium expressed in the form of SrO" that is greater than 0.8%, preferably greater than 6.7%, and/or less than 25.4%, preferably less than 17%, more preferably less than 11.8%.

The product of the invention presents a percentage by weight of "manganese expressed in the form of MnO" that is greater than 30.3%, preferably greater than 31.5%, and/or less than 37.2%, preferably less than 35.7%, more preferably less than 34.7%.

Ignoring impurities, the product of the invention presents a percentage of lanthanum-strontium-manganese perovskite of formula $(La_{1-x}Sr_x)_{1-y}MnO_3$ that is greater than 99.9%, preferably with x>0.02, preferably 0.15<x, and/or x<0.35, preferably x<0.25.

Ignoring impurities, the product of the invention presents more than 99.9% lanthanum-strontium-manganese perovskite and $0\leq y$ and/or $y\leq 0.1$. Advantageously these two latter preferences give the cast product properties of high electrical conductivity and make it particularly suitable, possibly after grinding, for fabricating cathodes for solid oxide fuel cells (SOFC).

The product of the invention may present the shape of a block having a thickness greater than 1 millimeter (mm), preferably greater than 2 mm, preferably greater than 5 centimeters (cm), more preferably greater than 15 cm, the thickness of a block being its smallest dimension. The block preferably presents a weight greater than 200 grams (g).

The product of the invention may also present the shape of a particle, which may present one or more of the following optional characteristics:

The particle of the invention is obtained or may be obtained using a method in accordance with the invention.

The particle of the invention presents a percentage by weight of "lanthanum expressed in the form of $La_2O_3$" that is greater than 38.4%, preferably greater than 47.9%, more preferably greater than 53.9%, and/or less than 69.7%, preferably less than 61.6%.

The particle of the invention presents a percentage by weight of "strontium expressed in the form of SrO" that is greater than 0.8%, preferably greater than 6.7%, and/or less than 25.4%, preferably less than 17%, more preferably less than 11.8%.

The particle of the invention presents a percentage by weight of "manganese expressed in the form of MnO" that is greater than 30.3%, preferably greater than 31.5%, and/or less than 37.2%, preferably less than 35.7%, more preferably less than 34.7%.

Ignoring impurities, the particle of the invention presents a percentage of lanthanum-strontium-manganese perovskite of formula $(La_{1-x}Sr_x)_{1-y}MnO_3$ that is greater than 99.9%, preferably with x>0.02, preferably 0.15<x, and/or x<0.35, preferably x<0.25.

Ignoring impurities, the particle of the invention presents more than 99.9% lanthanum-strontium-manganese perovskite and $0\leq y$ and/or $y\leq 0.1$. Advantageously these two latter preferences give the particles properties of high electrical conductivity and make them particularly suitable, possibly after grinding, for fabricating cathodes for solid oxide fuel cells (SOFC).

The product may also be in the form of a particle of size smaller than 4 mm, e.g. less than 3 mm. The sphericity of the particle may be greater than 0.5, preferably greater than 0.6, where sphericity is defined as the ratio between its smallest dimension and its greatest dimension.

The product of the invention need not have been subjected to annealing heat treatment after solidification or cooling and/or need not be the result of grinding.

Finally, the invention provides the use of particles or, possibly after grinding, of a block, that results from implementing a method of the invention or using a fused product, in particular fused particles, of the invention, in the fabrication of cathodes for solid oxide fuel cells (SOFC).

The percentage of lanthanum-strontium-manganese perovskite ignoring impurities is defined using the following formula (1):

$$T=100\times(A_{LSM})/(A_{LSM}+A_{30.4<2\theta<31.6}) \quad (1)$$

where:

$A_{LSM}$ is the area of the main doublet of lanthanum-strontium-manganese perovskite as measured on an X-ray diffraction pattern obtained from an apparatus of the D5000 diffractometer type from the supplier Bruker provided with a copper DX tube, and without deconvolution treatment; and $A_{30.4<2\theta<31.6}$ is the area measured on the same pattern, and without deconvolution treatment, of those phases that present a diffraction peak in the range of angles extending from $2\theta=30.4°$ to $2\theta=31.6°$. Amongst others, the $La_2MnO_4$ phase presents a diffraction peak in this range of angles.

In general, the term "fused product" designates a solid product, possibly annealed, obtained by complete solidification of a composition in the liquid state (here referred to as a "molten liquid"). The "unmolded" product as obtained at the end of step $e_2$) may still include zones that have not solidified, and immediately after unmolding it is therefore not considered as being a fused product.

The term "fused particle" designates a solid particle, possibly annealed, obtained by solidifying a composition in the liquid state.

The term "size" of a particle designates the average of its greatest dimension dM and its smallest dimension dm: (dM+dm)/2.

The thickness of a block is its smallest dimension.

The term "impurities" designates inevitable ingredients necessarily introduced together with the raw materials or resulting from reactions with these ingredients.

A method of the invention for fabricating particles in the first embodiment of the invention is described below in detail.

In step $a_1$), the starting charge is formed using the specified oxides, or precursors thereof. Compositions can be adjusted by adding pure oxides or mixtures of oxides and/or precursors, in particular $La_2O_3$, SrO, $SrCO_3$, $MnO_2$, MnO, or $Mn_3O_4$.

In the invention, the person skilled in the art adjusts the composition of the starting charge so as to obtain, at the end of step $d_1$), a particle in accordance with the invention. The chemical analysis of the fused particle of the invention is generally substantially identical to that of the starting charge. However, where appropriate, the person skilled in the art knows how to adapt the composition of the starting charge, e.g. in order to take account of the presence of volatile elements or of the disappearance of certain elements during fusing.

Preferably, no element other than $La_2O_3$, SrO, $SrCO_3$, $MnO_2$, MnO, and $Mn_3O_4$ and precursors thereof is voluntarily introduced into the starting charge, with the other elements that are present being impurities.

Preferably, the sum of $La_2O_3$, SrO, $SrCO_3$, $MnO_2$, MnO, $Mn_3O_4$, and precursors thereof represents more than 99% by weight of the starting charge.

The raw materials can be mixed together intimately in a mixer. The mixture is then poured into a fusion furnace.

In step $b_1$), the starting charge is fused, preferably in an electric arc furnace. Electrofusion enables large quantities of particles to be fabricated with advantageous efficiencies.

For example, it is possible to use a Heroult type arc furnace having two electrodes and in which the vessel has a diameter of about 0.8 meters (m), and is capable of containing about 180 kilograms (kg) of molten liquid. The voltage preferably lies in the range 140 volts (V) to 180 V, the power is about 240 kilowatts (kW), and the energy used lies in the range 1150 kilowatt hours per (metric) tonne (kWh/t) to 2800 kWh/t.

However any known furnace can be envisaged, such as an induction furnace, a plasma furnace, or other types of Heroult furnace, providing they are capable of causing the starting charge to melt completely. Without this necessarily being the case, it is possible to increase the quality of stirring by bubbling through an oxidizing gas (e.g. air or oxygen) as mentioned in FR 1 208 577. The quality with which the molten liquid is stirred can be improved in particular by bubbling through a gas containing 35% by volume of oxygen.

In step $c_1$), a stream of molten liquid at a temperature preferably lying in the range 1600° C. to 1800° C. is dispersed into small liquid droplets.

Dispersion may be the result of blowing through the stream of molten liquid. However any other method of atomizing a molten liquid known to the person skilled in the art could be envisaged.

In step $d_1$), the liquid droplets are transformed into solid particles by contact with an oxygenated fluid, preferably a gas, more preferably with air and/or steam. The oxygenated fluid preferably includes at least 20%, or even at least 25%, by volume of oxygen.

The method is preferably adapted in such a manner that once the droplet of molten liquid has formed it comes immediately into contact with the oxygenated fluid. More preferably, dispersion (step $c_1$)) and solidification (step $d_1$)) are substantially simultaneous, the molten liquid being dispersed by an oxygenated fluid suitable for cooling and solidifying this liquid.

Contact with the oxygenated fluid is preferably maintained at least until the particles have solidified completely.

Preferably, no solidification means are used other than cooling by contact with the oxygenated fluid. Thus, for example, it is preferable not to use the hyperquenching method of spraying droplets of molten liquid against a cooled metal wall.

The rate of cooling is a function of particle diameter. It is about 1000 K/s for particles having a size of 0.3 mm.

At the end of step $d_1$), solid particles of the invention are obtained that present a size lying in the range 0.01 mm to 3 mm, as a function of dispersion conditions.

Advantageously, and in surprising and unexplained manner, putting the molten liquid into contact with an oxygenated fluid enables industrial quantities of lanthanum-strontium-manganese perovskite to be obtained at reduced cost and at a percentage ignoring impurities that is remarkable, reaching more than 90%, and even more than 99.9%, without any annealing step.

Nevertheless, other phases may be present, as may impurities coming from the raw materials.

In a preferred embodiment, the impurities are all of the ingredients other than oxides of lanthanum, strontium, and manganese, and other than combinations of these oxides.

In particular, the following elements may be found as impurities: Al; Ca; Si; Zr; Na; Ba; and Fe. Preferably, the total content of impurities, expressed in the form of oxides, is less than 0.7% by weight, preferably less than 0.4%, more preferably:

$Al_2O_3$<0.5% preferably $Al_2O_3$<0.1%; and/or
CaO<0.25% preferably CaO<0.05%; and/or
$SiO_2$<0.1% preferably $SiO_2$<0.06%; and/or
$ZrO_2$<0.5% preferably $ZrO_2$<0.05%; and/or
$Na_2O$<0.05%; and/or
BaO<0.1% preferably BaO<0.06%; and/or
$Fe_2O_3$<0.05%.

At the end of step $d_1$), particles of the invention are obtained.

In an optional subsequent step $e_1$), the particles are introduced into a furnace to be subjected to annealing heat treatment. Advantageously, such annealing serves to further increase the percentage of lanthanum-strontium-manganese perovskite. This makes it possible to obtain lanthanum-strontium-manganese perovskite percentages substantially equal to 100%, ignoring impurities.

The annealing temperature preferably lies in the range 1050° C. to 1400° C., more preferably in the range 1100° C. to 1200° C., and still preferably is about 1150° C. This temperature is preferably maintained for a duration longer than 0.5 hours, preferably longer than 2 hours, and is preferably about 5 hours. Preferably, the annealing heat temperature is performed under an atmosphere containing at least 20% by volume of oxygen, preferably under air, preferably at ambient pressure of about 1 bar.

The fused particles of the invention may be ground before or after annealing. Where necessary, grain size selection is then performed, as a function of the intended application.

The particles of the invention may advantageously present a variety of sizes, the fabrication method not being limited to obtaining perovskite powders of submicron size. It is thus well suited to industrial fabrication.

In addition, the particles obtained can advantageously be used for fabricating a cathode for solid oxide fuel cells (SOFC).

The following examples are given for illustrative purposes and do not limit the invention. The particles tested were fabricated as follows.

The starting raw materials were initially mixed together intimately in a mixer:
  $La_2O_3$ powder sold by the supplier Treibacher, having purity greater than 99% by weight and of median size less than 45 μm;
  $SrCO_3$ powder sold by the supplier SPCH, of purity greater than 96% by weight and presenting underflow of greater than 99% through a 45 μm screen; and
  $MnO_2$ powder sold by the supplier Delta, of purity greater than 91% by weight and of median size of about 45 μm.

The starting charge as obtained in this way, having a weight of 50 kg, was poured into a Heroult type arc fusion furnace. It was then melted implementing fusion with long arcs (voltage: 160 V, Power: 240 kW, the applied energy varying, depending on the example, over the range 1300 kWh/t to 2800 kWh/t so as to melt the entire mixture in a complete and homogeneous manner. Preparation conditions were oxidizing.

In some examples, the quality of stirring was improved by bubbling through a gas containing 35% by volume of oxygen, as described in FR 1 208 577.

Once fusion was complete, the molten liquid was cast so as to form a stream. The temperature of the molten liquid as measured during casting lay in the range 1600° C. to 1800° C.

Dry compressed air was blown at a pressure of 3 bars to break up the stream and disperse it into droplets of molten liquid.

The blown air cooled the droplets and froze them in the form of fused particles. Depending on blast conditions, the melted particles can be spherical or otherwise, hollow or solid. They generally present a size lying in the range 0.01 mm to 3 mm.

Chemical analyses were performed and the percentage of lanthanum-strontium-manganese perovskite phase was determined on samples presenting a median size of less than 40 μm.

The chemical analysis was performed by X-ray fluorescence.

The percentage of lanthanum-strontium-manganese perovskite was determined using X-ray diffraction patterns acquired with a D5000 diffractometer from the supplier Bruker provided with a copper DX tube. After fusing and solidification, the products obtained can comprise the perovskite phase together with other phases, in smaller quantities, such as $La_2MnO_4$.

The lanthanum-strontium-manganese perovskite phases are identified using the conventional protocol, by X-ray diffraction, using an ICDD sheet. For example ICDD sheet No. 00-053-0058 applies to the $La_{0.8}Sr_{0.2}MnO_3$ lanthanum-strontium-manganese perovskite phase.

In practice, measurements of the lanthanum-strontium-manganese perovskite percentage are carried out when the X-ray diffraction pattern shows:
  a majority lanthanum-strontium-manganese perovskite phase;
  minority phases in the 2θ angle range from 30.4° to 31.6°; and
  other minority phases not presenting peaks in the angle ranges taken into consideration for measuring the above-mentioned phases.

Then, using the EVA software (sold by the supplier Bruker) and after subtracting the continuous background (background 0.8), it is possible to measure the area (without deconvolution treatment) between 2θ=30° 4 and 31.6° for all of the phases present, including amongst others $La_2MnO_4$, and also the area (without deconvolution treatment) of the main doublet of lanthanum-strontium-manganese perovskite. The percentage of lanthanum-strontium-manganese perovskite is then calculated using formula (1).

Thus, if the lanthanum-strontium-manganese perovskite is the only phase present in the X-ray diffraction pattern, and thus $A_{30.4<2\theta<31.6}$ is zero, then the perovskite percentage is equal to 100%.

Table 1 summarizes the results obtained prior to any annealing heat treatment.

TABLE 1

| | Voltage (V) | Applied energy (kWh/t) | Gas bubbling during fusion | Chemical analysis obtained $(La_{1-x}Sr_x)_{1-y}MnO_3$ | | LSM perovskite percentage (%) |
|---|---|---|---|---|---|---|
| | | | | x | y | |
| $1_1$ | 160 | 2800 | No | 0.2 | 0.04 | >99.9 |
| $2_1$ | 160 | 1300 | No | 0.2 | 0.07 | >99.9 |
| $3_1$ | 160 | 1500 | Yes | 0.2 | 0.07 | >99.9 |

Table 1 shows up the effectiveness of the method of the invention.

Heat treatment was then performed on the product of Example $1_1$ under the following conditions:
  temperature 1150° C.;
  soak time: 5 hours;
  atmosphere: air at atmospheric pressure (ambient pressure).

After heat treatment, the product presents a lanthanum-strontium-manganese perovskite percentage of 100%, ignoring impurities.

A method of the invention for fabricating a fused block, using the second embodiment of the invention, is describe below in detail.

In step $a_2$), the starting charge is determined as in step $a_1$) described above, with the preferred characteristics, and in particular those relating to the selection of elements present or to their quantities, being the same as in above-described step $a_1$).

In the invention, the person skilled in the art adjusts the composition of the starting charge so as to obtain, at the end of step $e_2$), a block in accordance with the invention. The chemical analysis of the block of the invention is generally substantially identical to that of the starting charge. However, where appropriate, the person skilled in the art knows how to adapt the composition of the starting charge, e.g. in order to take account of the presence of volatile elements or of the disappearance of certain elements during fusing.

The raw materials can be mixed together intimately in a mixer. The mixture is then poured into a fusion furnace.

In step $b_2$), the starting charge is fused, e.g. in an electric arc furnace, so as to fuse the entire starting charge in complete and homogenous manner.

Electrofusion enables large blocks to be fabricated, possibly having thickness of 150 mm, with advantageous efficiencies. For example, it is possible to use a Heroult type arc furnace having two electrodes and a vessel of diameter of about 0.8 m and capable of containing about 180 kg of molten liquid. The voltage used preferably lies in the range 140 V to 180 V, the power is about 240 kW, and the energy lies in the range 1150 kWh/t to 2800 kWh/t.

However any known furnace could be envisaged, such as an induction furnace, a plasma furnace, or other types of Heroult furnace, providing they enable the starting charge to be melted completely. Without this necessarily being the case, it is possible to increase the quality of stirring by bubbling through an oxidizing gas (e.g. air or oxygen) as mentioned in FR 1 208 577. The quality of the stirring of the molten liquid may in particular be improved by bubbling through a gas containing 35% by volume of oxygen.

An induction furnace is most preferred, e.g. as described in FR 1 430 962. Advantageously, the block can thus be unmolded prior to solidifying completely, while the core of the block is still liquid. As can be seen in the description below, this early unmolding advantageously increases the percentage of lanthanum-strontium-manganese perovskite.

The temperature of the molten liquid as measured during casting preferably lies in the range 1600° C. to 1800° C.

In step $c_2$), the molten liquid is cast into a mold suitable for withstanding the bath of molten liquid. It is preferable to use molds made of graphite, of cast iron, or as defined in U.S. Pat. No. 3,993,119. With an induction furnace, the turn is considered as constituting the mold. Casting is preferably performed in air.

In step $d_2$), the liquid cast into the mold is cooled to obtain a block that is solidified at least in part.

During solidification, the molten liquid is preferably put into contact with an oxygenated fluid, preferably a gas, preferably air. This putting into contact can be performed as soon as casting begins. Nevertheless, it is preferable not to initiate this contact until after casting. For practical reasons, putting into contact with the oxygenated fluid is preferably initiated only after unmolding, and preferably as soon as possible after unmolding.

The oxygenated fluid preferably includes at least 20%, or even at least 25%, by volume of oxygen.

Preferably, contact is maintained with the oxygenated fluid until the block has solidified completely. The contact may be direct, e.g. for the surfaces of the molten liquid cast into the mold and forming the interface with ambient air. It may also be indirect, e.g. for the still-molten liquid in the core of a block whose outside surfaces have already solidified. Oxygen must then pass through the "walls" as constituted in this way in order to reach the molten liquid.

Said putting of the molten liquid that is solidifying into contact with an oxygenated fluid is preferably initiated less than 1 hour, preferably less than 30 minutes, more preferably less than 20 minutes after the beginning of solidification.

Advantageously, in surprising and unexplained manner, putting the molten liquid into contact with an oxygenated fluid increases in remarkable manner the percentage of lanthanum-strontium-manganese perovskite within the fused block of the invention, up to substantially 100%. No annealing step is then needed in order to obtain such percentages.

In addition, the inventors have discovered that the rate of cooling during solidification is not a determining factor for improving the percentage of lanthanum-strontium-manganese perovskite. The rate of cooling is thus preferably always maintained below 1000 K/s, preferably below 100 K/s, more preferably below 50 K/s. Advantageously, conventional simple cooling means can thus be used. Preferably, in order to solidify the molten liquid, i.e. freeze it, use is made only of molds in contact with the surrounding air or that are cooled in particular by circulation of a heat-conveying fluid, or when the block is extracted from the mold and contains molten liquid, the block can be put into contact with the oxygenated fluid. Reliability and costs are thus improved.

In step $e_2$), the block is unmolded. To facilitate putting the molten liquid in contact with an oxygenated fluid, it is preferable to unmold the block as quickly as possible, if possible prior to complete solidification. Solidification then continues in step $e_2$).

Preferably, the block is unmolded as soon as it presents sufficient stiffness to be capable of substantially conserving its shape. Preferably, the block is unmolded as quickly as possible and it is then immediately put into contact with the oxygenated fluid.

Preferably, unmolding is performed less than 20 minutes after the beginning of solidification.

After complete solidification, a block of the invention is obtained that contains a quantity of lanthanum-strontium-manganese perovskite that is as much increased as the molten liquid has been put into contact with oxygen at an early stage during solidification, and then kept in contact therewith.

In an optional step $f_2$), the unmolded block is put into a furnace to be subjected to annealing heat treatment. Advantageously, such annealing enables the percentage of lanthanum-strontium-manganese perovskite to be increased substantially. It is thus possible to obtain lanthanum-strontium-manganese perovskite percentages greater than 99%, preferably greater than 99.9%, and even substantially equal to 100%, ignoring impurities.

When the lanthanum-strontium-manganese perovskite percentage, ignoring impurities, is more than 99.9%, the composition and the structure of the lanthanum-strontium-manganese perovskite can be expressed by the formula $(La_{1-x}Sr_x)_{1-y}MnO_3$ where $0<x\leq0.5$ and $-0.05\leq y\leq0.24$, the parameters $\underline{x}$ and $\underline{y}$ of the formula being the atom proportions of each element.

Advantageously, the annealing heat treatment increases the percentage of lanthanum-strontium-manganese perovskite even if it is not possible to put any molten liquid in contact with an oxygenated fluid, e.g. because the block being fabricated is already fully solidified at the time of unmolding, and it was not possible to put it into contact with an oxygenated fluid while it was cooling in the mold, or while it was being cast.

The parameters of the annealing heat treatment are a function of the dimensions of the blocks being treated. Preferably, these parameters as follows:

annealing temperature: in the range 1050° C. to 1400° C., preferably about 1150° C.; and duration of soak at temperature: greater than 30 minutes, preferably greater than 2 hours, preferably about 5 hours, starting from the moment when all of the block has reached the soak temperature (at the surface of the block and in the core of the block). For example, for blocks in which all of the dimensions are less than 5 mm, the soak duration is preferably about 5 hours. For a cylindrical block having a diameter of 200 mm and a height of 150 mm, the soak duration is preferably about 12 hours.

Under all circumstances, it is preferable for the annealing heat treatment to be performed under an atmosphere containing at least 20%, or even at least 25%, by volume of oxygen, preferably under air, preferably at ambient pressure of about 1 bar.

The annealing heat treatment must be performed after the block has solidified completely. Before being annealed, the block may nevertheless be broken into pieces or into a powder. The block is preferably ground into the form of particles having a size of about 5 mm or less than 5 mm.

The method of the invention leads to a block of the invention having a majority of the lanthanum-strontium-manganese perovskite phase. In particular, after annealing heat treatment, the annealed block or particles of the invention present a lanthanum-strontium-manganese perovskite percentage, ignoring impurities, of more than 99%, preferably of more than 99.9%, preferably of 100%.

Nevertheless, other phases can be present, as can impurities coming from the raw materials. The impurities are all the elements other than the oxides of lanthanum, strontium, and manganese and other than combinations of said oxides.

In particular, it is possible to find the following elements as impurities: Al; Ca; Si; Zr; Na; Ba; and Fe. Preferably, the total percentage by weight of impurities expressed in oxide form is less than 0.7%, preferably less than 0.4%. More preferably:

$Al_2O_3$<0.5% preferably $Al_2O_3$<0.1%; and/or
CaO<0.25% preferably CaO<0.05%; and/or
$SiO_2$<0.1% preferably $SiO_2$<0.06%; and/or
$ZrO_2$<0.5% preferably $ZrO_2$<0.05%; and/or
$Na_2O$<0.05%; and/or
BaO<0.1% preferably BaO<0.06%; and/or
$Fe_2O_3$<0.05%.

The block of the invention may advantageously present arbitrary dimensions, the fabrication method not being limited to obtaining perovskite powders of submicron size.

The block is thus well suited to industrial fabrication. Preferably, the block presents a thickness greater than 1 mm, preferably greater than 2 mm, preferably greater than 5 cm, more preferably greater than 15 cm, where the thickness of a block is its smallest dimension.

In order to obtain a powder, e.g. for fabricating a cathode for a solid oxide fuel cell (SOFC), the optionally annealed block is subsequently crushed and ground to the desired grain size. Advantageously, the method of the invention enables particles to be fabricated having a variety of dimensions and at low cost.

Preferably, the unmolded block is initially crushed into pieces in the range 0 to 5 mm. Then annealing heat treatment is performed on the pieces, which are subsequently ground to the desired grain sizes.

The examples below are given for illustrative purposes and do not limit the invention. The blocks tested were fabricated as follows.

The starting raw materials, identical to those used for the examples of the first embodiment of the invention, were initially mixed together intimately in a mixer.

The starting charge as obtained in that way was poured into an arc fusion furnace. Fusion was performed using long arcs so as to melt the entire mixture in complete and homogeneous manner. Preparation conditions were oxidizing. The temperature of the molten liquid as measured during casting lay in the range 1600° C. to 1800° C.

The molten liquid was then cast, in air, into a variety of molds: made of cast iron, of graphite, or as defined in U.S. Pat. No. 3,993,119.

The rate of cooling "Vr" in Table 2 below is defined by the following formula:

$$Vr = (Tf - Ts)/t_r$$

where Tf designates the temperature of the molten liquid during casting (in ° C.), Ts designates the temperature of the block at the instant at which it is completely solidified (in ° C.), and $t_r$ designates the time between the beginning of casting and the moment when the block has solidified completely (in seconds).

The chemical analyses and the determination of the lanthanum-strontium-manganese perovskite phase were performed on samples ground into powder and representative of the cast blocks. The powders presented a median diameter of less than 40 μm.

The chemical analysis was performed by X-ray fluorescence.

The lanthanum-strontium-manganese perovskite percentage was determined from X-ray diffraction patterns as described above for the examples relating to the first embodiment.

Tables 2 and 2' summarize the results obtained before any annealing heat treatment.

No gas was bubbled through during fusion.

Examples 8 and 9 relate to blocks fabricated using a method using fusion by induction in accordance with FR 1 430 962, having a turn with a diameter of 275 mm, power lying in the range 120 kW to 220 kW, and a frequency delivered by the aperiodic generator lying in the range 100 kHz to 250 kHz.

"D999, h888" designates a cylinder having a diameter D of 999 mm and a height $\underline{h}$ of 888 mm.

TABLE 2

| Example | Voltage (V) | Applied energy (kwh/t) | Mass of fused charge (kg) | Kind of mold | Vr (° C./s) | Dimensions of cast block (mm) |
|---|---|---|---|---|---|---|
| $1_2$ | 140 | 1200 | 50 | According to U.S. Pat. No. 3,993,119 | 30 | Thickness: 5 mm Recess of radius |
| $2_2$ | 150 | 2400 | 46 | Graphite | 0.055 | 180 × 180 × 150 |
| $3_2$ | 150 | 1400 | 46 | Graphite | 0.055 | 180 × 180 × 150 |
| $4_2$ | 150 | 1400 | 46 | Cast iron | 0.055 | D200, h150 |
| $5_2$ | 150 | 1400 | 46 | Cast iron | 0.055 | D200, h150 |
| $6_2$ | 180 | 1400 | 50 | Cast iron | 0.055 | D200, h150 |
| $7_2$ | 180 | 1400 | 50 | Cast iron | 0.055 | D200, h150 |
| $8_2$ | — | — | 75 | Turn of coil | 0.04 | D275, h190 |
| $9_2$ | — | — | 75 | Turn of coil | 0.04 | D275, h190 |

TABLE 2'

| Example | Chemical analysis in % by weight | | | | Perovskite obtained $(La_{1-x}Sr_x)_{1-y}MnO_3$ | | LSM perovskite percentage after fusion |
|---|---|---|---|---|---|---|---|
| | $La_2O_3$ | SrO | MnO | Impurities | x | y | |
| $1_2$ | 56.8 | 9.6 | 33.3 | 0.3 | — | — | 84 |
| $2_2$ | 58.4 | 8.2 | 33 | 0.4 | — | — | 90 |
| $3_2$ | 58 | 9.1 | 32.4 | 0.5 | — | — | 88 |
| $4_2$ | 58.5 | 8.8 | 32.4 | 0.3 | — | — | 92 |
| $5_2$ | 59 | 8.8 | 31.8 | 0.4 | — | — | 93 |
| $6_2$ | 57.1 | 9.6 | 32.7 | 0.6 | — | — | 97 |
| $7_2$ | 56.7 | 9.6 | 33.2 | 0.5 | — | — | 97 |
| $8_2$ | 58 | 9.2 | 32.5 | 0.3 | 0.2 | 0.03 | 100 |
| $9_2$ | 51.9 | 9.4 | 38.2 | 0.5 | 0.22 | 0.24 | 99.9 |

Table 2' shows the effectiveness on the method of the invention. It also makes it possible to observe that during fusion by induction (Examples $8_2$ and $9_2$) where the surfaces of the unmolded block come more quickly into contact with the oxygen of the air (after 20 minutes at most in these examples, while the block was not yet completely solidified), the percentage of lanthanum-strontium-manganese perovskite in the final product was very high, reaching substantially 100%, thus advantageously making it pointless to have recourse to annealing heat treatment.

Examples $1_2$, $2_2$, $4_2$, and $5_2$ were subsequently subjected to annealing heat treatment (Table 2). The annealing heat treatment was performed on cast blocks or on blocks crushed to the 0 to 5 mm range (Example 1). The heat treatment parameters used are specified in Table 3. The heat treatment was performed in air.

The method even makes it possible to fabricate products that present lanthanum-strontium-manganese perovskite having the formula $(La_{1-x}Sr_x)_{1-y}MnO_3$ with $0<x\leq0.5$ and $-0.05\leq y\leq0.24$ at percentages, ignoring impurities, of more than 99.9%, or even of 100%.

The dimensions of the products may subsequently be reduced, for example the products may be ground into the form of powders if that is required by their utilization.

Naturally, the present invention is not limited to the embodiments described and provided as illustrative and non-limiting examples.

Beyond the element strontium, the invention relates to a product, in particular in the form of a particle or a block, comprising LTM perovskite, where L designates lanthanum, T is an element selected from strontium, calcium, magnesium, barium, yttrium, ytterbium, cerium, and mixtures of

TABLE 3

| | Parameters of annealing heat treatment | | | | Chemical analysis obtained after heat treatment $(La_{1-x}Sr_x)_{1-y}MnO_3$ | | LSM perovskite percentage after heat treatment |
|---|---|---|---|---|---|---|---|
| Dimensions | Temperature (° C.) | soak duration (hours) | Atmosphere | | x | y | |
| $1_2$ 0 to 5 mm | 1150 | 5 | Air | | 0.21 | 0.06 | 100 |
| $2_2$ 180 × 180 × 150 | 1150 | 12 | Air | | 0.18 | 0.06 | 100 |
| $4_2$ D200, h150 | 1150 | 12 | Air | | 0.19 | 0.03 | 100 |
| $5_2$ D200, h150 | 1150 | 12 | Air | | 0.19 | 0 | 100 |

Table 3 shows that the treatment leads to a significant increase in the percentage of lanthanum-strontium-manganese perovskite, up to substantially 100%.

As can be seen clearly at this point, the method of the invention makes it possible in simple and inexpensive manner to fabricate industrial quantities of products, and in particular of particles and blocks, that present high percentages of lanthanum-strontium-manganese perovskite and that present the following chemical analysis, in percentages by weight for a total of 100%:

36%<lanthanum expressed in the form $La_2O_3$<70.7%;
0%<strontium expressed in the form of SrO<25.8%;
29.3%<manganese expressed in the form MnO<41.2%; and
impurities<0.7%.

these elements, and M designates manganese. The invention also provides methods of fabricating this product.

The embodiments relating to these products and methods, in which element T is not restricted to strontium, are said to be "generalized".

It is common practice to express the structure of such an LTM perovskite in the form $ABO_3$. However, to be completely accurate, such a perovskite presents a structure of the $(La_{(1-x)}T_x)_{(1-y)}MnO_{(3-\delta)}$ type. The values of $\underline{x}$ and $\underline{y}$ can be determined from X-ray diffraction patterns and/or by chemical analysis if the product has an LTM perovskite percentage greater than 99.9% and if the sum of the elements constituting the perovskite is greater than 99% in percentage by weight based on the oxides. Since perovskite is electrically neutral, the value $\delta$ corresponds to the value necessary for ensuring that the perovskite structure is electrically neutral. It is generally accepted that the value of δ depends essentially on the valency state of the element manganese.

The above-mentioned LTM perovskite powders are used in particular to fabricate cathodes for solid oxide fuel cells, using methods that are complex and expensive, as mentioned in the introduction. There thus exists a need for products comprising LTM perovskite that can be fabricated at reduced cost and in industrial quantities. An object of the invention is to satisfy this need.

More precisely, in present-day solid oxide fuel cells (SOFCs), each electrode is generally subdivided into two layers. In the special case of the cathode, the first layer acts as a current collector layer (CCL). One of the raw materials used as a cathode material in SOFC technology is a powder of doped lanthanum-manganese (LTM) perovskite.

The active layer in the cathode, known as the "cathode functional layer" (CFL) is situated between the CCL and the electrolyte, and must make it possible simultaneously to supply electrons to the system in order to reduce oxygen from the air into $O^{2-}$ ions and to transport these $O^{2-}$ ions to the electrolyte. To do this, the active CFL is generally made up of a mixture of ionically-conductive material and of electronically-conductive material (doped lanthanum-manganese perovskite). Contact between the two materials and air must be optimized, i.e. the number of triple points must be as large as possible and there must be grain percolation for each of the materials.

Doped zirconias (cubic zirconia stabilized with yttrium oxide, cubic zirconia stabilized with scandium, . . . ) are commonly used as electrolyte materials or in the functional cathode layer.

Contact between the doped zirconia powder and the doped lanthanum-manganese perovskite powder is thus intimate and the number of points of contact between these two powders is high.

The doped lanthanum-manganese perovskite of the cathode material can react with the doped zirconiam of the electrolyte to form new phases at their interface, in particular a $La_2Zr_2O_7$ pyrochlore-type phase, in particular when $\underline{x}$ is less than 0.4, or even less than 0.3 in the formula for the LTM perovskite. The presence of this phase reduces the performance of the cell.

In order to increase the performance of SOFCs, there is thus a need for a doped lanthanum-manganese perovskite that is suitable for forming only a small quantity of $La_2Zr_2O_7$ pyrochlore-type phase when in contact with a doped zirconia powder.

Another object of the invention is to satisfy this need.

According to the invention, these objects are achieved by means of a fused product, in particular in the form of a particle or a block, made of LTM perovskite, where L designates lanthanum, T is an element selected from strontium, calcium, magnesium, barium, yttrium, ytterbium, cerium, and mixtures of these elements, and M designates manganese.

The product of the invention may in particular be present in the form of a powder. The size of the particles may in particular be greater than 1 μm, or greater than 10 μm, or greater than 0.25 mm, and/or less than 3 mm.

This powder may in particular comprise more than 90% by weight, or more than 95% or substantially 100% of fused particles of LTM perovskite of the invention.

The product of the invention is fused, i.e. it is obtained by being fused and then solidified. Although the fabrication of fusion-solidification products is well known, the merit of the inventors lies in discovering such that a technique can enable products containing LTM perovskite to be fabricated. Advantageously, the product of the invention can thus be fabricated at low cost and in industrial quantities.

The product of the invention may be an annealed product or a product which has not been annealed, i.e. which has not been thermically treated after its solidification.

In addition, as explained in greater detail below, the product of the invention, when in contact with yttrium oxide doped zirconia powder always generates less polychlore-type phase $La_2Zr_2O_7$ than the prior art products that have the same chemical composition. It is therefore very well adapted to fabricating cathodes for SOFCs.

The content and the nature of the resulting LTM perovskite depend in particular on the composition of the starting charge. Nevertheless, the product of the invention is always polycrystalline.

In an embodiment of the invention, the fused product has an LTM perovskite percentage greater than 50%, ignoring impurities, said perovskite presenting molar proportions $l_p$, $t_p$, and $m_p$ of lanthanum, of the element T, and of manganese, respectively, such that using the notation:

$$x = \frac{t_p}{(l_p + t_p)}$$

and $$y = 1 - \frac{(l_p + t_p)}{m_p}$$

x>0, preferably x>0.02, preferably x>0.15, and/or x≤0.5, preferably x≤0.4, preferably x<0.35, preferably x≤0.3, preferably x<0.25; and y≥−0.1, preferably y≥2−0.05, preferably y≥0, and/or y≤0.24, preferably y≤0.1.

The variables $\underline{x}$ and $\underline{y}$ correspond to the atom proportions $\underline{x}$ and $\underline{y}$ of the $(La_{(1-x)}T_x)_{(1-y)}MnO_{(3-\delta)}$ structure of the LTM perovskite of the product of the invention.

The definition of the LTM perovskite percentage of a product is given below in the present description.

Preferably, the product of the invention includes one and preferably more of the following optional characteristics:
- the LTM perovskite percentage, ignoring impurities, is greater than 70%, preferably greater than 90%, preferably greater than 99%, more preferably greater than 99.9%, or is even 100%;
- the product of the invention is obtained, or can be obtained, by a method in accordance with the invention as described in greater detail below;
- the element T that is used is selected from the group constituted by calcium, strontium, barium, magnesium, and mixtures thereof. The element T is preferably calcium and/or strontium.

The impurities content is less than 1%, preferably less than 0.7%.

Advantageously, these characteristics improve the electrical conductivity properties, making the products particularly suitable, possibly after grinding, for fabricating cathodes for solid oxide fuel cells (SOFC).

The product of the invention need not be subjected to annealing heat treatment after cooling, and/or need not be the result of grinding.

The invention also provides a method of fabricating a fused product comprising LTM perovskite, where L designates lanthanum (La), T is an element selected from the group formed by strontium, calcium, magnesium, barium, yttrium, ytterbium, cerium, and mixtures of these elements, and M designates manganese (Mn), the method comprising the following steps:

a') mixing raw materials providing lanthanum, the element T, and manganese, so as to form a starting charge;

b') fusing the starting charge to obtain a molten liquid;

c') cooling said molten liquid until it has solidified completely, so as to obtain a fused product.

Merely by adapting the composition of the starting charge, conventional fusion-solidification methods thus make it possible, from a molten liquid, to fabricate fused products of different sizes presenting an LTM perovskite percentage, ignoring impurities, that is greater than 50%, preferably greater than 70%, preferably greater than 90%, more preferably greater than 99%, still preferably greater than 99.9%, or even substantially 100%.

This particularly surprising discovery goes against technical prejudices which, in the past, have led the person skilled in the art to be interested only in the above-mentioned complex and expensive methods.

The fabrication method of the invention preferably further includes one and preferably more of the following optional general characteristics:

the element T that is selected and the quantities of lanthanum, of the element T, and of manganese in the starting charge are determined in such a manner that the products obtained at the end of step c') are in accordance with the invention;

the element T is a lanthanum dopant selected from the group formed by calcium, strontium, barium, magnesium, and mixtures thereof. These dopants significantly improve the conductivity of LTM perovskite;

at least one of the elements L, T, ad M is introduced in oxide form;

the compounds delivering the elements L, T, and M together represent more than 90% and preferably more than 99% in percentages by weight of the ingredients of the starting charge. These compounds, together with the impurities, preferably represent 100% of the ingredients of the starting charge;

the compounds providing the elements L, T, and M are selected from SrO, $SrCO_3$, $La_2O_3$, CaO, $CaCO_3$, $Y_2O_3$, $Yb_2O_3$, MgO, $MgCO_3$, $CeO_2$, BaO, $MnO_2$, MnO, or $Mn_3O_4$;

in step b'), no use is made of a plasma torch or of a heat gun. In particular, use is made of an arc furnace or of an induction furnace.

In a first generalized embodiment, the invention relates to a product in the form of a particle and to a method of fabricating such particles.

In particular, the invention provides a method of fabrication comprising steps a'), b'), and c'), with step c') comprising the following steps:

$c_1$') dispersing the molten liquid in the form of liquid droplets; and $d_1$') solidifying the liquid droplets by contact with an oxygenated fluid, so as to obtain fused particles.

The method is preferably adapted so as to obtain particles of an LTM perovskite product of the invention.

Merely by adapting the composition of the starting charge, conventional dispersion methods, in particular by blowing or by atomizing, thus make it possible starting with a molten liquid to fabricate particles of different sizes presenting an LTM perovskite percentage, ignoring impurities, that are greater than 50%, preferably greater than 70%, more preferably greater than 90%, more preferably greater than 99%, and still preferably greater than 99.9%, even substantially 100%.

In the first generalized embodiment, the fabrication method of the invention preferably also includes one, and preferably more than one, of the general optional characteristics listed above and/or of the following particular characteristics:

in step $b_1$'), no use is made of a plasma torch or of a heat gun. For example, an arc furnace is used. Advantageously, this improves productivity. In addition, methods implementing a plasma torch or a heat gun generally do not make it possible to fabricate particles having a size greater than 200 μm, or at least greater than 500 μm;

in step $c_1$') and/or step $d_1$'), said molten liquid is put into contact with an oxygenated fluid, preferably identical to that used in step $d_1$');

the oxygenated fluid, preferably a gas, preferably air, contains at least 20%, or even at least 25%, by volume of oxygen;

the dispersion and solidification steps are simultaneous;

contact is maintained between the droplets and an oxygenated fluid until said droplets have solidified completely; and the fused particles may be annealed. The particles are preferably annealed at a temperature lying in the range 1050° C. to 1400° C., preferably about 1150° C., for a soak time at high temperature of at least 30 minutes, preferably greater than 2 hours, preferably about 5 hours. More preferably, they are annealed under an atmosphere containing at least 20% by volume of oxygen, preferably under air, preferably at atmospheric pressure.

The fused particles may be ground and/or subjected to an operation of selecting grain size as a function of the intended applications, e.g. by screening, in particular in such a manner that the particles obtained present a size greater than 1 μm, or greater than 10 μm, and/or less than 3 mm.

In a second generalized embodiment, the invention relates to a product in the form of a block and to a method of fabricating such a block.

In particular, the invention provides a fabrication method comprising steps a'), b'), and c'), with step c') comprising the following steps:

$c_2$') casting the molten liquid into a mold;

$d_2$') solidifying the liquid cast into the mold by cooling to obtain a block that is solidified at least in part; and $e_2$') unmolding the block.

In the second generalized embodiment, the fabrication method of the invention preferably also comprises one, and preferably more than one, of the general optional characteristics listed above and/or of the following particular characteristics:

in step $b_2$'), an induction furnace is used;

in step $c_2$') and/or in step $d_2$') and/or after step $e_2$'), said molten liquid that is solidifying is put directly or indirectly into contact with an oxygenated fluid, preferably comprising at least 20%, or even at least 25%, of oxygen, preferably a gas, more preferably air;

said contact is initiated immediately after unmolding the block;

said contact is maintained until after the block has solidified completely;

the unmolding of step $e_2$') is implemented before the block has solidified completely;

the block is unmolded as soon as it presents sufficient rigidity to be able to conserve its shape substantially;

the rate of cooling of the molten liquid during solidification is always less than 1000 K/s, preferably less than 100 K/s, more preferably less than 50 K/s. When a cast iron or graphite mold is used, the rate of cooling is preferably less than 1 K/s;

after step $e_2'$), the unmolded block is annealed. Preferably, the block is annealed at a temperature lying in the range 1050° C. to 1400° C., preferably 1150° C., with a soak at high-temperature of a duration measured from the moment when the entire block has reached the soak temperature (at the surface of the block and in the core of the block) that is preferably greater than 30 minutes, preferably greater than 2 hours, preferably about 5 hours. More preferably, the block is annealed under an atmosphere containing at least 20% by volume of oxygen, preferably under air, preferably at atmospheric pressure; and the optionally annealed unmolded block is broken into pieces or powder.

Whatever the embodiment under consideration, phases other than LTM perovskite may be present, together with impurities coming from the raw materials.

In the preferred embodiment, the impurities are all the elements other than lanthanum, the element T, manganese, and combinations of those elements.

In particular, the following elements may be found as impurities: Al; Si; Zr; Na; and Fe, or even Ba; Sr; Mg; Y; Yb; Ce; or Ca when the element T does not comprise respectively: barium, strontium, magnesium, yttrium, ytterbium, cerium, or calcium. Preferably, the total percentage by weight of impurities, expressed in the form of oxides, is less than 1%, preferably less than 0.7%, more preferably less than 0.4%. More preferably:

$Al_2O_3$<0.5% preferably $Al_2O_3$<0.15%, more preferably $Al_2O_3$<0.1%; and/or $SiO_2$<0.1% preferably $SiO_2$<0.07%; preferably $SiO_2$<0.06; and/or $ZrO_2$<0.5% preferably $ZrO_2$<0.1%, preferably $ZrO_2$<0.05; and/or $Na_2O$<0.1%, preferably $Na_2O$<0.07, preferably $Na_2O$<0.05%; and/or $Fe_2O_3$<0.05%.

Finally, the invention concerns the use of fused products fabricated or being suitable for being fabricated by a method of the invention or fused products of the invention in the fabrication of cathodes for solid oxide fuel cells S(SOFC).

The LTM perovskite percentage, ignoring impurities is defined using the following formula (1):

$$T=100 \times (A_{LTM})/(A_{LTM}+A_{secondary\ phase}) \quad (1)$$

in which:

$A_{LTM}$ is the area of the diffraction main peak or main multiplet of the LTM perovskite phases as measured on an X-ray diffraction pattern obtained from an apparatus of the D5000 diffractometer type from the supplier Bruker provided with a copper DX tube, and without deconvolution treatment; and $A_{secondary\ phase}$ is the area measured on the same pattern, and without deconvolution treatment, of the diffraction main peak or main multiplet of the secondary phase. The secondary phase is the minority phase presenting the main peak or multiplet of greatest area, ignoring the LTM perovskite phase. Amongst others, the $La_2MnO_4$ phase may be the secondary phase identified on the X-ray diffraction pattern.

A multiplet is the partial superposition of a plurality of peaks. For example, a multiplet made up of two peaks is a doublet, and a multiplet made up of three peaks is a triplet.

A method in accordance with the first generalized embodiment of the invention is described below in detail.

In step $a_1'$), a starting charge suitable for fabricating a particle of the invention is formed from compounds of lanthanum, of the element T, and of manganese, in particular in the form of oxides or of carbonates, or from precursors of the elements lanthanum, T, and manganese. The compositions can be adjusted by adding pure oxides or mixtures of oxides and/or of precursors, in particular SrO, $SrCO_3$, $La_2O_3$, CaO, $CaCO_3$, $Y_2O_3$, $Yb_2O_3$, MgO, $MgCO_3$, $CeO_2$, BaO, $MnO_2$, MnO, or $Mn_3O_4$. The use of oxides and/or carbonates improves the availability of oxygen needed for forming perovskite, and is thus preferred.

The quantities of lanthanum, of the element T, and of manganese in the starting charge are practically the same in the fabricated fused product. Some of these ingredients, in quantities that are variable as a function of fusion conditions, can be volatilized during the fusion step. On the basis of general knowledge, or by performing simple routine tests, the person skilled in the art knows how to adapt the quantities of these ingredients in the starting charge as a function of the quantities desired in the fused products and of the fusion conditions implemented.

The grain sizes of the powders used may be those commonly encountered in fusion methods.

The basic mixture may comprise, in addition to the compounds providing the elements lanthanum, T, and manganese, and the impurities, other compounds that are introduced for comparing particular properties on the fabricated particles.

Nevertheless, preferably no compound other than those providing the elements lanthanum, T, and manganese, and in particular no compound other than $La_2O_3$, SrO, $SrCO_3$, $MnO_2$, MnO, $Mn_3O_4$, CaO, $CaCO_3$, $Y_2O_3$, $Yb_2O_3$, MgO, $MgCO_3$, $CeO_2$, BaO is voluntarily introduced into the starting charge, the other elements present being impurities. In an embodiment, the sum of $La_2O_3$, SrO, $SrCO_3$, $MnO_2$, MnO, $Mn_3O_4$, CaO, $Y_2O_3$, $Yb_2O_3$, MgO, $CeO_2$, BaO and of their precursors represents more than 99% by weight of the starting charge.

Preferably, the compounds providing the elements lanthanum, T, and manganese are selected from $La_2O_3$, SrO, $SrCO_3$, $MnO_2$, MnO, $Mn_3O_4$, CaO, $CaCO_3$, and their precursors, the sum of these ingredients preferably representing more than 99% by weight of the starting charge. Still preferably, no compound other than $La_2O_3$, SrO, $SrCO_3$, $MnO_2$, MnO, $Mn_3O_4$, CaO, $CaCO_3$ is voluntarily introduced into the starting charge, the other elements present being impurities.

To increase the LTM perovskite percentage, it is preferable for the molar proportions of the elements L, T, and M in the starting charge to be close to those of the perovskite it is desired to fabricate.

Thus, in the starting charge, it is preferable for the molar proportions $l_d$, $t_d$, and $m_d$ of the elements L, T, and M respectively, as molar percentages relative to the sum of the proportions $l_d$, $t_d$, and $m_d$, to satisfy the following conditions:

$$k_1 \cdot (1-x) \cdot (1-y) \leq l_d/m_d \leq k_2 \cdot (1-x) \cdot (1-y) \quad (1)$$

and/or $$k_1 \cdot x \cdot (1-y) \leq t_d/m_d \leq k_2 \cdot x \cdot (1-y) \quad (2)$$

in which:
x and y may take the above-defined values, and in particular:

$0 < x \leq 0.5$ and $-0.1 \leq y \leq 0.24$ $k_1$ is equal to 0.8, preferably equal to 0.9; and
$k_2$ is equal to 1.2, preferably equal to 1.1.

Naturally, these values for $k_1$ and $k_2$ are those to be used under established working conditions, i.e. ignoring transition phases between different compositions and ignoring starting stages. If the desired product implies a change in the composition of the starting charge compared with that used for fabricating the preceding product, it is necessary to take account of the residues of the preceding product in the furnace. Nevertheless, the person skilled in the art knows how to adapt the starting charge accordingly.

The raw materials can be mixed together intimately in a mixer. The mixture is then poured into a fusion furnace.

In step $b_1'$), the starting charge is fused, preferably in an electric arc furnace. Electrofusion makes it possible to fabricate large quantities of particles with advantageous efficiencies.

For example, it is possible to use a Heroult type arc furnace having two electrodes and a vessel with a diameter of about 0.8 m, and capable of containing about 180 kg of molten liquid. The voltage preferably lies in the range 140 V to 180 V, with power of about 240 kW, and energy lying in the range 1150 kWh/t to 2800 kWh/t.

However, all known furnaces can be envisaged, such as an induction furnace, a plasma furnace, or other types of Heroult furnace, providing they make it possible to melt the starting charge completely. Without this being necessarily the case, it is possible to increase the quality of the stirring by bubbling through an oxidizing gas (e.g. air or oxygen), as mentioned in FR 1 208 577. The quality with which the molten liquid is stirred can be improved in particular by bubbling through a gas containing 35% by volume of oxygen.

At the end of step $b_1'$), the entire starting charge is in liquid form.

In step $c_1'$), a stream of molten liquid at a temperature that is preferably greater than 1600° C., and preferably less than 2200° C., more preferably less than 1800° C. when the element T is strontium, is dispersed in the form of small liquid droplets.

The dispersion may be the result of blowing through the stream of molten liquid. However any other method of atomizing a molten liquid, known to the person skilled in the art, could be envisaged.

In step $d_1'$), the liquid droplets are transformed into solid particles by contact with an oxygenated fluid, preferably a gas, more preferably with air and/or steam. The oxygenated fluid preferably contains at least 20%, or even at least 25%, oxygen by volume.

The method is preferably adapted in such a manner that immediately on being formed, the droplet of molten liquid comes into contact with the oxygenated fluid. More preferably, the dispersion and solidification steps (steps $c_1'$) and $d_1'$)) are substantially simultaneous, the molten liquid being dispersed by an oxygenated fluid suitable for cooling and solidifying the liquid.

Contact with the oxygenated fluid is preferably maintained at least until the particles have solidified completely.

Preferably, no use is made of solidification means other than cooling by contact with the oxygenated fluid. Thus, for example, it is preferable not to use the hyperquenching method of spraying molten liquid droplets against a cooled metal wall.

Blowing air at ambient temperature is entirely suitable.

Cooling rate is a function of particle diameter. It is about 1000 K/s for particles having a size of 0.3 mm. The cooling rate is preferably adapted so that the particles have become hard, at least at their peripheries, before coming into contact with the recovery container.

At the end of step $d_1'$), the solid particles of the invention are obtained presenting a size lying in the range 0.01 mm to 3 mm, or in the range 0.01 mm to 4 mm, as a function of dispersion conditions.

Advantageously, and in surprising and unexplained manner, putting the molten liquid into contact with an oxygenated fluid makes it possible, and at low cost, to obtain industrial quantities of LTM perovskite at percentages, ignoring impurities, that are remarkable, reaching more than 90%, and even more than 99.9%, without an annealing step.

In an optional subsequent step $e_1'$), the fused particles are introduced into a furnace to be subjected to annealing heat treatment. Advantageously, such annealing can further increase the percentage of LTM perovskite. It is thus possible to obtain LTM perovskite percentages substantially equal to 100%, ignoring impurities.

The annealing temperature preferably lies in the range 1050° C. to 1400° C., more preferably in the range 1100° C. to 1200° C., and still preferably, is about 1150° C. This temperature is preferably maintained for a duration longer than 0.5 hours, preferably longer than 2 hours, preferably about 5 hours. The annealing heat treatment is preferably performed under an atmosphere containing at least 20% by volume of oxygen, preferably under air, preferably at ambient pressure of about 1 bar.

The fused particles of the invention may be ground, before or after being annealed. If necessary, grain size selection can then be performed, depending on the intended application.

Particles of the invention may advantageously present a variety of dimensions, the fabrication method not being limited to obtaining perovskite powders of submicron size. It is thus well adapted to industrial fabrication.

In addition, the particles that are obtained may advantageously be used for fabricating a cathode for solid oxide fuel cells (SOFC).

The examples below are given for illustrative purposes and do not limit the invention. The particles tested were fabricated as follows.

The following starting raw materials were initially mixed together intimately in a mixer:

$La_2O_3$ powder sold by the supplier Treibacher, having purity greater than 99% by weight and of median size less than 45 µm;

CaO powder sold by the supplier La Gloriette, of purity greater than 93% by weight and presenting underflow of greater than 90% through a 80 µm screen; and $MnO_2$ powder sold by the supplier Delta, of purity greater than 91% by weight and of median size of about 45 µm.

The starting charge obtained in this way, weighing 50 kg, was poured into a Heroult type arc fusion furnace. It was then melted using long arc fusion (voltage of 150 V, power of 225 kW, applied energy varying in the examples over the range 1380 kWh/t to 2000 kWh/t) so as to melt the entire mixture in complete and homogeneous manner. Working conditions were oxidizing.

Once fusion was complete, the molten liquid was cast so as to form a stream. The temperature of the molten liquid as measured during casting lay in the range 1730° C. to 1850° C.

Dry compressed air at ambient temperature and blown at a pressure lying in the range 1 bar to 3 bars was used to break up the stream and disperse the molten liquid in droplets.

The blown air cooled the droplets and froze them in the form of fused particles. Depending on air blowing conditions, the fused particles can be made to be spherical or otherwise, hollow or solid. They present a size lying in the range 0.01 mm to 3 mm, or in the range 0.01 mm to 4 mm.

Chemical analyses and lanthanum-strontium-manganese perovskite phase determinations were performed on samples presenting a median size of less than 40 µm after being ground.

Chemical analysis was performed by X-ray fluorescence.

The lanthanum-strontium-manganese perovskite percentage was determined using X-ray diffraction patterns acquired with a D5000 diffractometer from the supplier Bruker, provided with a copper DX tube. After fusion, the products obtained can comprise the perovskite phase together with smaller quantities of other phases such as $La_2MnO_4$.

The lanthanum-strontium-manganese perovskite phases are identified using the conventional protocol, by X-ray diffraction, using International Center for Diffraction Data (ICDD) sheets. For example, the ICDD 01-089-8084 sheet is the sheet for the $La_{0.7}Ca_{0.3}MnO_{3-\delta}$ lanthanum-calcium-manganese perovskite phase.

In practice, measurements of the lanthanum-calcium-manganese perovskite percentages are performed when the X-ray diffraction pattern shows:
  a majority lanthanum-calcium-manganese perovskite phase; and
  a secondary phase and possibly other minority phases.

Then, with EVA software (sold by the supplier Bruker), and after subtracting the continuous background (background 0.8), it is possible to measure the area $A_{LTM}$ (without deconvolution treatment) of the main diffraction peak or multiplet of lanthanum-calcium-manganese perovskite and the area $A_{secondary\,phase}$ (without deconvolution treatment) of the main diffraction peak or multiplet of the secondary phase. The lanthanum-calcium-manganese perovskite percentage is then calculated using formula (1).

Thus, if the lanthanum-calcium-manganese (LCM) perovskite phase is the only phase present in the X-ray diffraction pattern, the perovskite percentage is 100%.

Table 4 summarizes the results obtained before any annealing heat treatment.

TABLE 4

| Example | Voltage (V) | Applied energy (kWh/t) | Resulting chemical analysis $(La_{1-x}Ca_x)_{1-y}MnO_{3-\delta}$ | | LCM perovskite percentage (%) |
| --- | --- | --- | --- | --- | --- |
| | | | x | y | |
| $1_1'$ | 150 | 1480 | 0.2 | 0 | >99.9 |
| $2_1'$ | 150 | 1500 | 0.21 | 0.01 | >99.9 |
| $3_1'$ | 150 | 1420 | 0.09 | 0.1 | >99.9 |
| $4_1'$ | 150 | 1440 | 0.14 | 0.06 | >99.9 |
| $5_1'$ | 150 | 1380 | 0.33 | −0.07 | >99.9 |
| $6_1'$ | 150 | 2000 | 0.36 | −0.1 | >99.9 |

Table 4 shows the effectiveness of the method of the invention.

Heat treatment was then performed on the products of Example 6 under the following conditions:
  temperature: 1150° C.;
  soak time at this temperature: 5 hours;
  atmosphere: air at atmospheric pressure (ambient pressure).
  After heat treatment, the product presented a lanthanum-calcium-manganese perovskite percentage of 100%, ignoring impurities.

As can be seen clearly at this point, the method of the invention in its first generalized embodiment makes it simple and inexpensive to fabricate industrial quantities of particles having very high levels of lanthanum-element T-manganese perovskite, where element T is an element selected from the group constituted by strontium, calcium, magnesium, barium, yttrium, ytterbium, and cerium.

In particular, the method makes it possible to fabricate particles that are constituted, ignoring impurities, by more than 99.9% or even 100% lanthanum-element T-manganese perovskite having the formula $(La_{1-x}T_x)_{1-y}MnO_{3-\delta}$ with $0<x\leq0.5$ and $-0.1\leq y\leq0.24$.

The dimensions of the particles can then be reduced, e.g. by grinding to form powders, if so required for their utilization.

A method in accordance with the second general embodiment of the invention is described below in detail.

In step $a_2'$), a starting charge was prepared as was explained for step $a_1'$) above, step $a_2'$) presenting the same preferred characteristics as step $a_1'$).

In step $b_2'$), the starting charge was fused. Any fusion furnace can be used. Fusion can be performed as explained in the description relating to step $b_1'$), or preferably in the description relating to step $b_2$) above. In particular, the description of step $b_2$) explained the advantage of using an induction furnace.

At the end of step $b_2'$), the entire starting charge is in liquid form.

In step $c_2'$), the molten liquid is cast into a mold, as explained above for step $c_2$). The cast molten liquid presents a temperature that is preferably greater than 1600° C. and preferably less than 2200° C., more preferably less than 1800° C. when the element T is strontium.

In step $d_2'$), the liquid cast into the mold is cooled until an at least partially solidified block is obtained, as described above for step $d_2$), step $d_2'$) possessing the same preferred characteristics as step $d_2$), in particular concerning putting into contact with an oxygenated fluid, cooling speeds, and cooling means.

Advantageously, in surprising and unexplained manner, putting the molten liquid into contact with an oxygenated fluid increases the LTM perovskite percentage within the fused block of the invention in remarkable manner, up to substantially 100%. No annealing step is then needed to obtain such percentages.

In addition, the inventors have found that the rate of cooling during solidification is not a determining factor for improving the LTM perovskite percentage. Advantageously, it is thus possible to make use of simple conventional cooling means.

In step $e_2'$), the block is unmolded as explained above for step $e_2$), step $e_2'$) presenting the same preferred characteristics as step $e_2$), in particular concerning the instant of unmolding and putting into contact with an oxygenated fluid.

In an optional step $f_2'$), the unmolded block is put into a furnace to be subjected to annealing heat treatment, as explained above for step $f_2$), with step $f_2'$) presenting the same preferred characteristics as step $f_2$), in particular concerning annealing parameters.

Advantageously, such annealing can significantly increase the LTM perovskite percentage. It is thus possible to obtain LTM perovskite percentages greater than 99%, preferably greater than 99.9%, and even substantially equal to 100%, ignoring impurities, and this can be done even if it is not possible to put any molten liquid into contact with an oxygenated fluid, e.g. because the fabricated block was already completely solidified at the moment of unmolding and no contact with an oxygenated fluid was possible during cooling in the mold or during casting.

The block of the invention may advantageously present arbitrary dimensions, the fabrication method not being limited to obtaining perovskite powders of submicron size.

The block is thus perfectly adapted to industrial fabrication. Preferably, the block presents a thickness greater than 1 mm, preferably greater than 2 mm, preferably greater than 5 cm, more preferably than 15 cm, where the thickness of a block is its smallest dimension.

In order to obtain a powder, e.g. for fabricating a cathode for a solid oxide fuel cell (SOFC), the optionally annealed block is subsequently crushed and ground to the desired grain size. Advantageously, the method of the invention enables particles to be fabricated having a variety of dimensions and at low cost.

Preferably, the unmolded block is initially crushed into pieces in the range 0 to 5 mm. Then annealing heat treatment is performed on the pieces, which are subsequently ground to the desired grain sizes.

The examples below are given for illustrative purposes and do not limit the invention. The blocks tested were fabricated as follows.

The starting raw materials, identical to those used for the examples of the first generalized embodiment relating to particles, were initially mixed together intimately in a mixer.

The resulting starting charge was poured into a Heroult type arc fusion furnace (except for Example $6_2$'). It was then melted by long arc fusion (voltage 180 V, applied energy varying between examples over the range 1150 kWh/t to 1760 kWh/t) so as to melt the entire mixture in complete and homogeneous manner. Operating conditions were oxidizing.

Once fusion was complete, the molten liquid was cast in air into cast iron molds. The temperature of the molten liquid measured during casting lay in the range 1560° C. to 1700° C.

The rate of cooling "Vr" was evaluated as described above (see Table 2).

Chemical analyses and lanthanum-calcium-manganese perovskite phase determinations were performed on samples that presented a median size less than 40 μm, after grinding.

Chemical analysis was performed by X-ray fluorescence.

Lanthanum-calcium-manganese perovskite phases were identified and their percentages determined in the same manner as in the first generalized embodiment (see Table 4).

Table 5 summarizes the results obtained before any annealing heat treatment.

No gas was bubbled through during fusion.

Example $6_2$' relates to a block fabricated by a method using fusion by induction in accordance with FR 1 430 962, with a turn having a diameter of 275 mm, power lying in the range 120 kW to 220 kW, and a frequency delivered by the aperiodic generator lying in the range 100 kHz to 250 kHz.

"D999, h888" designates a cylinder of diameter D of 999 mm and a height $\underline{h}$ of 888 mm.

TABLE 5

| Example | Voltage (V) | Applied energy (kWh/t) | Mass of fused charge (kg)) | Kind of mold | Vr (° C./s) | Dimensions of cast block (mm) |
|---|---|---|---|---|---|---|
| $1_2$' | 180 | 1400 | 50 | Cast iron | <0.1 | D200, h150 |
| $2_2$' | 180 | 1400 | 50 | Cast iron | <0.1 | D200, h150 |
| $3_2$' | 180 | 1760 | 50 | Cast iron | <0.1 | D200, h150 |
| $4_2$' | 180 | 1150 | 40 | Cast iron | <0.1 | D200, h150 |
| $5_2$' | 180 | 1700 | 40 | Cast iron | <0.1 | D200, h150 |
| $6_2$' | — | — | 75 | Turn of coil | <0.1 | D275, h190 |

In Table 5' below, the content of the element lanthanum is expressed in the form of $La_2O_3$, the content of the element calcium is expressed in the form CaO, and the content of the element manganese is expressed in the form MnO.

TABLE 5'

| | Chemical analysis in % by weight | | | | Perovskite obtained $(La_{1-x}Ca_x)_{1-y}MnO_{3-\Delta}$ | | LSM perovskite percentage |
|---|---|---|---|---|---|---|---|
| Example | $La_2O_3$ | CaO | MnO | Impurities | x | y | (%) |
| $1_2$' | 61.0 | 6.6 | 32.1 | 0.3 | — | — | 81 |
| $2_2$' | 58.8 | 5.7 | 35.3 | 0.2 | — | — | 83 |
| $3_2$' | 56.9 | 6.9 | 35.6 | 0.7 | — | — | 89 |
| $4_2$' | 64.6 | 3.6 | 31.5 | 0.3 | — | — | 81 |
| $5_2$' | 55.9 | 7.1 | 36.6 | 0.3 | — | — | 85 |
| $6_2$' | 59.3 | 5.7 | 34.8 | 0.2 | 0.22 | 0.05 | 99.9 |

Table 5' shows the effectiveness of the method of the invention. It also shows that when fusion is performed by induction (Example $6_2$') where the surfaces of the unmolded block came more quickly into contact with oxygen of the air (after a maximum of 20 minutes from the beginning of solidification in this example, when the block was still not completely solidified), the lanthanum-calcium-manganese perovskite percentage in the final product is very high, reaching 99.9%, which advantageously can make it pointless to have recourse to annealing heat treatment.

Examples $1_2$', $2_2$', $3_2$', and $5_2$' were subsequently subjected to annealing heat treatment (Table 6). The annealing heat treatment was performed on cast blocks or on blocks crushed into 0-5 mm pieces (Examples $1_2$' and $2_2$' The heat treatment parameters used are given in Table 6. The heat treatment was performed in air.

The LTM perovskite percentages were determined as in the above examples relating to particles of LTM, specifically relating to particles of lanthanum-calcium-manganese.

TABLE 6

| | Parameters of annealing heat treatment | | | Chemical analysis obtained after heat treatment $(La_{1-x}Ca_x)_{1-y}MnO_{3-\delta}$ | | LSM perovskite percentage after heat treatment |
|---|---|---|---|---|---|---|
| Dimensions | Temperature (° C.) | soak duration (hours) | Atmosphere | x | y | (%) |
| 1  0 to 5 mm | 1150 | 5 | Air | 0.24 | −0.09 | 100 |
| 2  0 to 5 mm | 1150 | 5 | Air | 0.22 | 0.07 | 100 |
| 3  D200, h150 | 1150 | 12 | Air | 0.26 | 0.06 | 100 |
| 5  D200, h150 | 1150 | 12 | Air | 0.27 | 0.09 | 100 |

Table 6 shows that the annealing treatment leads to a significant increase in the lanthanum-calcium-manganese perovskite percentage, up to substantially 100%.

As can be seen now clearly, the method according to the second generalized embodiment of the invention makes it simple and inexpensive to fabricate industrial quantities of blocks having very high levels of lanthanum-element T-manganese perovskite, where element T is an element selected from the group constituted by strontium, calcium, magnesium, barium, yttrium, ytterbium, and cerium.

In particular, the method makes it possible to fabricate blocks that are constituted, ignoring impurities, by more than 99.9% or even 100%, of lanthanum-element T-manganese perovskite having the formula $(La_{1-x}T_x)_{1-y}MnO_{3-\delta}$ with $0<x\leq 0.5$ and $-0.1\leq y\leq 0.24$.

When the element T is calcium, the method makes it possible in particular to fabricate blocks containing lanthanum-calcium-manganese (LCM) perovskite in which:
- the percentage by weight of "lanthanum expressed in the form of $La_2O_3$" is greater than 40.2%, preferably greater than 43.3%, preferably greater than 51.8%, more preferably greater than 56.8%, and/or less than 70.8%, preferably less than 69.9%, preferably less than 68.9%, more preferably less than 63.6%; and/or
- the percentage by weight of "calcium expressed in the form of CaO" is greater than 0.44%, preferably greater than 3.7%, and/or less than 16.1%, preferably less than 15.6%, preferably less than 10%, more preferably less than 6.8%; and/or
- the percentage by weight of "manganese expressed in the form of MnO" is greater than 28.7%, preferably greater than 29.6%, preferably greater than 30.6%, more preferably greater than 32.6%, and/or less than 46%, preferably less than 41.8%, preferably less than 38.6%, more preferably less than 36.6%.

The dimensions of the blocks can then be reduced, e.g. by grinding into the form of powders if that is required for their utilization.

Fused LTM perovskite products are particularly remarkable in that the quantity of the $La_2Zr_2O_7$ pyrochlore-type phase that is generated, measured using the above-described protocol, is always less than the quantity of the $La_2Zr_2O_7$ pyrochlore-type phase that is generated under the same conditions using an LTM perovskite powder obtained by a method other than by fusion. This property would even appear to constitute a signature of the products of the invention.

The method used for measuring this property is as follows.

Ten grams (g) of LTM perovskite powder for testing, presenting a median size less than 1.5 μm, are mixed intimately with 10 g of zirconia powder stabilized with 8 mol % yttrium oxide. Pellets of this mixture are then pressed and sintered at high temperature, in a cycle including a soak of 24 hours at 1375° C.

The median size of the LTM powders and the parameters of the sintering heat treatment have been determined so as to favour the formation of a $La_2Zr_2O_7$ pyrochlore-type phase, so as to highlight the behavior differences of the LTM powders when they are in contact with a zirconia powder stabilized with 8 mol % yttrium oxide.

The quantity of $La_2Zr_2O_7$ pyrochlore-type phase contained in the sintered sample, expressed relative to the total quantity of $La_2Zr_2O_7$ pyrochlore-type phase and of zirconia in the sample, is measured by X-ray diffraction. The measurement is thus a comparative measurement, not a quantitative measurement.

Comparisons between different LTM perovskite powders can easily be performed while taking care to use the same protocol, and also the same stabilized zirconia powder.

Preferably, all of the samples are sintered in the same furnace, in order to limit any dispersions that might arise due to the method of preparing the samples to be characterized.

EXAMPLES

The following tests were performed in order to illustrate the capacity of fused perovskite products to generate less $La_2Zr_2O_7$ phase when in contact at high temperature with a stabilized zirconia powder.

The tests consisted in intimately mixing a zirconia powder with a doped lanthanum-manganese (LTM) perovskite powder, in preparing pellets, then in raising to high temperature to encourage the creation of the $La_2Zr_2O_7$ phase.

The quantity of said phase that has been generated relative to the quantity of the zirconia in the sample was then determined by X-ray diffraction.

In detail, the following methodology was used.

Samples comprising LTM powders for comparison were prepared as follows.

10 g of TZ-8Y zirconia powder (zirconia stabilized with 8 mol % yttrium oxide and presenting a median size $d_{50}$ of 0.212 μm (measured by sedigraphy), and a specific surface area of 15.2 m²/g) sold by the supplier Tosoh, and 10 g of one of the LTM perovskite powders for comparison, presenting a median size between 0.16 and 1.1 μm, possibly after grinding in a Netzsch grinder of LME(1) type using beads of zirconia stabilized with 16.5 mol % cerium oxide having a grain size lying in the range 0.8 mm to 1 mm, were mixed together using a stainless steel spatula in a glass beaker, until the color was uniform. The mixture was then transferred in small quantities into an agate mortar to be ground by hand using an agate mortar, and then all of the powder was again mixed in the glass beaker with the stainless steel spatula.

Pellets having a diameter of 13 mm and a thickness of substantially 5 mm were then made using a pelleting-press: 2.8 g of powder were put therein and pressed under 50 kilonewtons (kN) with a manual Weber press for 1 min.

The pellets were then placed on an aluminum saggar provided with a cover.

The assembly was put into a Naber 1800 furnace sold by the supplier Nabertherm, then raised to 1375° C. for 24 hours, with temperature being raised at 5° C./min and being reduced at 5° C./min.

Each sintered pellet was then thinned in a grinder so as to remove a thickness of about 2 mm, thus revealing the core of the material. Finally the pellet was coated in a transparent resin and polished.

X-ray diffraction measurements were achieved using a D5000 apparatus from the supplier Bruker provided with a copper DX tube. The X-ray diffraction pattern was made with a step size of 0.02° and an acquisition time of 4 seconds per step. In practice, those diagrams make it possible to detect:
  a $La_2Zr_2O_7$ pyrochlore-type phase having its main peak diffracting at $2\theta \approx 28.7°$ (ICDD sheet 00-017-0450); and
  a cubic zirconia phase having its main peak diffracting at $2\theta \approx 30.5°$ (ICDD sheet 00-027-0997 or 01-049-1642).

Then using the EVA software (sold by the supplier Bruker) and after subtracting the continuous background (background 0.8), it is possible to measure the area of the peak of the $La_2Zr_2O_7$ pyrochlore-type phase in the angle range $28.4° < 2\theta < 29.10$ and the area of the peak of the cubic zirconia phase in the angle range $29.3° < 2\theta < 30.8°$.

The result is given in the form of the following ratio:

$$\frac{\text{area}(La_2Zr_2O_7)}{\text{area}(La_2Zr_2O_7) + \text{area}(\text{cubic zirconia})}$$

The various LTM perovskite powders compared were the following:
  comparative art powders obtained by methods other than fusion, such as synthesis by solid phase sintering, synthesis from precursors and spray pyrolysis:
    (strontium-doped lanthanum) and manganese perovskite powder sold by the supplier NexTech Materials under name LSM20-P; this is referred to below as "comparative example 1";
    (strontium-doped lanthanum) and manganese perovskite powder sold by the supplier Praxair under the name $(La_{0.8}Sr_{0.2})_{0.98}$Mn Oxide, referred to below as "comparative example 2"; and
    (strontium-doped lanthanum) and manganese perovskite powder synthesized by solid phase sintering by the applicant from an intimate mixture of powders of $La_2O_3$, $SrCO_3$, and $MnO_2$ sintered in a cycle including a soak for 10 hours at 1450° C., referred to, below, as "comparative example 3";

powders of fused perovskite products of the invention:
  fused (strontium-doped lanthanum) and manganese perovskite powder of the invention, referred to, above, as "Example $1_2$", that had not been subjected to any annealing treatment (see Table 2');
  fused (strontium-doped lanthanum) and manganese perovskite powder of the invention previously referred to as "Example $1_2$", that had been subjected to an annealing treatment in air at 1150° C. with a 5-hour soak (see Table 3);
  fused (strontium-doped lanthanum) and manganese perovskite powder of the invention referred to, above, as "Example $1_1$", that had not been subjected to any annealing treatment (see Table 1);
  fused (strontium-doped lanthanum) and manganese perovskite powder of the invention referred to as "Example A", that had not been subjected to any annealing treatment; and
  fused (calcium-doped lanthanum) and manganese perovskite powder of the invention referred to as "Example B", and that had not been subjected to any annealing treatment.

These perovskites presented the following chemical compositions:

TABLE 7

| Example | Composition |
| --- | --- |
| Comparative 1 | $(La_{0.8}Sr_{0.2})_{0.99}MnO_{3-\delta}$ |
| Comparative 2 | $(La_{0.8}Sr_{0.2})_{0.98}MnO_{3-\delta}$ |
| Comparative 3 | $(La_{0.81}Sr_{0.19})_{0.99}MnO_{3-\delta}$ |
| A | $(La_{0.64}Sr_{0.36})MnO_{3-\delta}$ |
| B | $(La_{0.79}Ca_{0.21})MnO_{3-\delta}$ |

Pellets were made from a mixture of each of these powders with stabilized zirconia as described above.

Table 8 summarizes the measured ratios of $$\frac{\text{area}(La_2Zr_2O_7)}{\text{area}(La_2Zr_2O_7) + \text{area}(\text{cubic zirconia})}$$

as determined for each of the samples made.

TABLE 8

| Example | Ratio $\frac{\text{area }(La_2Zr_2O_7)}{\text{area }(La_2Zr_2O_7) + \text{area (cubic zirconia)}}$ |
| --- | --- |
| Comparative 1 | 0.049 |
| Comparative 2 | 0.043 |
| Comparative 3 | 0.043 |
| $1_1$ not annealed | 0.017 |
| $1_2$ not annealed | 0 |
| $1_2$ annealed | 0 |
| A (not annealed) | 0 |
| B (not annealed) | 0 |

Table 8 shows clearly that powders of fused perovskite products of the invention present a ratio $$\frac{\text{area}(La_2Zr_2O_7)}{\text{area}(La_2Zr_2O_7) + \text{area}(\text{cubic zirconia})}$$

that is comparatively much smaller than powders of prior art perovskite products obtained by a method other than fusion. In the products of the invention, the $La_2Zr_2O_7$ pyrochlore-type phase can even be undetectable.

Advantageously, the performance of solid oxide fuel cells using these products is improved as a result.

Besides, Table 8 (example $1_2$) shows that an annealing step does not change the advantageous behavior of a product of the invention. Therefore, after annealing, a product of the invention remains different than the comparative examples.

The LTM perovskite products may also generate prejudicial $T_aZr_bO_c$ type phases, a, b and c being integers, when they are in contact with zirconia, as described here above. The quantity of each $T_aZr_bO_c$ type phase, expressed on the basis of the total quantity of this $T_aZr_bO_c$ type phase and of the cubic zirconia, is always less with the fused products of the invention than with not fused products according to prior art, as it is showed by the underlying examples.

The method which is used to measure the quantity of a $T_aZr_bO_c$ type phase is similar to the method used to measure the quantity of $La_2Zr_2O_7$ pyrochlore-type phase that was described previously.

For example, when the element T of the perovskite of LTM is strontium (Sr), the phase to be measured is $SrZrO_3$. The diffraction patterns show:
  a $SrZrO_3$ type phase, having its main diffraction peak at $2\theta \approx 30.8°$;
  a cubic zirconia phase, having its main diffraction peak at $2\theta \approx 30.5°$ (ICDD sheet 00-027-0997 or 01-049-1642).

Then, using the EVA software (sold by the supplier Brucker) and after substracting the continuous background (background 0.8), it is possible to measure the area of the peak of the $SrZrO_3$ type phase in the angle range $30.5°<2\theta<31.2°$ and the area of the peak of the cubic zirconia phase in the angle range $29.3°<2\theta<30.8°$.

The result in given in the form of the following ratio:

$$\frac{\text{area}(SrZrO_3)}{\text{area}(SrZrO_3) + \text{area}(\text{cubic zirconia})}$$

The various LSM perovskite powders compared were the following:
  comparative (strontium-doped lanthanum) and manganese perovskite powder, synthetised by solid phase sintering by the applicant from an intimate mixture of powders of $La_2O_3$, $SrCO_3$, and $MnO_2$ sintered in a cycle including a soak for 10 hours at 1450° C., referred to, below, as "comparative example 4".
  fused (strontium-doped lanthanum) and manganese perovskite powder of the invention referred to as "Example C", that had not been subjected to any annealing treatment.

These perovskites present the following chemical composition:

TABLE 9

| Example | Composition |
| --- | --- |
| Comparative 4 | $(La_{0.63}Sr_{0.37})MnO_{3-\delta}$ |
| C | $(La_{0.63}Sr_{0.37})MnO_{3-\delta}$ |

Table 10 summarizes the measures of the ratio "area $(SrZrO_3)/(\text{area } SrZrO_3 + \text{area (cubic zirconia)})$" determined for each of the fabricated samples.

TABLE 10

| Example | Ratio area $(SrZrO_3)$/area $(SrZrO_3)$ + area (cubic zirconia)) |
| --- | --- |
| Comparative 4 | 0.068 |
| C | 0 |

Table 10 clearly shows that the powders of the fused products of LSM perovskite according to the invention have a ratio area$(SrZrO_3)$/(area$(SrZrO_3)$+area(cubic zirconia)) which is comparatively much smaller than the powders of perovskite products obtained with another method than fusion. In the products of the invention, the $SrZrO_3$ phase may even be undetectable.

Advantageously, the performances of solid oxide fuel cells using these products are therefore increased.

Naturally, the present invention is not limited to the embodiments described that are given as illustrative and non-limiting examples.

In particular, the products of the invention are not limited to any particular shape or dimensions.

The invention claimed is:

1. A method of fabricating a fused product comprising the following steps:
  a') mixing raw materials providing lanthanum, the element T, and manganese, so as to form a starting charge;
  b') fusing the starting charge in a vessel of a furnace to obtain a molten liquid and casting said liquid;
  c') cooling said molten liquid until it has solidified completely, so as to obtain a polycrystalline fused product comprising LTM perovskite, L designating lanthanum, T being an element selected from strontium, calcium, magnesium, barium, yttrium, ytterbium, cerium, and mixtures of these elements, and M designating manganese, the product presenting the shape of a block having a thickness greater than 1 mm or the shape of a particle.

2. A method according to claim 1, said perovskite presenting molar proportions $l_p$, $t_p$, and $m_p$ of lanthanum, of element T, and of manganese respectively such that, writing:

$x = t_p/(l_p+t_p)$ and $y = 1-(l_p+t_p)/m_p$ then:
  $x>0$ and/or $x \leq 0.5$; and
  $y \geq -0.1$ and/or $y \leq 0.24$.

3. A method according to claim 2, in which $x \leq 0.4$.

4. A method according to claim 3, in which:
  $x>0.02$ and/or $x<0.35$; and/or
  $-0.05 \leq y$ and/or $y \leq 0.1$.

5. A method according to claim 4, in which $x \leq 0.3$.

6. A method according to claim 5, in which:
  $0.15<x$ and/or $x<0.25$; and/or
  $0 \leq y$.

7. A method according to claim 1, said fused product having an LTM perovskite percentage greater than 50%, ignoring impurities.

8. A method according to claim 7, in which the LTM perovskite percentage, ignoring impurities, is greater than 90% in said fused product.

9. A method according to claim 8, in which the LTM perovskite percentage, ignoring impurities, is greater than 99% in said fused product.

10. A method according to claim 9, in which the LTM perovskite percentage, ignoring impurities, is greater than 99.9% in said fused product.

11. A method according to claim 10, said perovskite being a lanthanum-strontium-manganese perovskite of formula $(La_{1-x} Sr_x)_{1-y}MnO_3$ with $0<x\leq 0.5$, and $-0.05\leq y\leq 0.24$, $\underline{x}$ and $\underline{y}$ being atom proportions.

12. A method according to claim 11, in which the formula of said lanthanum-strontium-manganese perovskite is such that:

$(x<0.5)$ and $(0\leq y$ and/or $y\leq 0.1)$.

13. A method according to claim 12, in which the formula of said lanthanum-strontium-manganese perovskite is such that:

$(0.15<x$ and/or $x<0.35)$.

14. A method according to claim 13, in which the formula of said lanthanum-strontium-manganese perovskite is such that:

$x<0.25$.

15. A method according to claim 1, the element T being a lanthanum dopant selected from the group formed by calcium, strontium, barium, magnesium, and mixtures thereof.

16. A method according to claim 15, the element T used being calcium and/or strontium.

17. A method according to claim 16, said fused product presenting the following chemical composition in percentages by weight and for a total of 100%:
36%<lanthanum expressed in the form $La_2O_3$<70.7%;
0%<strontium expressed in the form SrO<25.8%;
29.3%<manganese expressed in the form of MnO<41.2%; and
impurities<0.7%.

18. A method according to claim 17, said fused product presenting the following chemical composition in percentages by weight and for a total of 100%:
38.4%<lanthanum expressed in the form $La_2O_3$<69.7%;
0%<strontium expressed in the form SrO<25.4%;
30.3%<manganese expressed in the form of MnO<37.2%; and
impurities<0.7%.

19. A method according to claim 18, said fused product presenting the following chemical composition in percentages by weight and for a total of 100%:
47.9%<lanthanum expressed in the form $La_2O_3$<69.7%;
0%<strontium expressed in the form SrO<17%;
30.3%<manganese expressed in the form of MnO<35.7%; and
impurities<0.7%.

20. A method according to claim 19, said fused product presenting the following chemical composition in percentages by weight and for a total of 100%:
47.9%<lanthanum expressed in the form $La_2O_3$<61.6%
6.7%<strontium expressed in the form SrO<17%;
31.5%<manganese expressed in the form of MnO<35.7%; and
impurities<0.7%.

21. A method according to claim 20, said fused product presenting the following chemical composition in percentages by weight and for a total of 100%:
53.9%<lanthanum expressed in the form $La_2O_3$<61.6%;
6.7%<strontium expressed in the form SrO<11.8%;
31.5%<manganese expressed in the form of MnO<34.7%; and
impurities<0.7%.

22. A method according to claim 1, that does not comprise an annealing heat treatment after cooling and/or any grinding of the product obtained at the end of step c').

23. A method according to claim 1, wherein the fused product is in the form of a block having thickness greater than 5 cm.

24. A method according to claim 23, wherein the fused product is in the form of a block having thickness greater than 15 cm.

25. A method according to claim 1, wherein the fused product is in the form of a particle, the sphericity of which being greater than 0.5.

26. A method according to claim 25, said particle having a size smaller than 4 mm.

27. A method according to claim 1, compounds providing the elements L, T, and M together representing more than 90% by weight of the ingredients of the starting charge.

28. A method according to claim 27, in which the compounds providing the elements L, T, and M together represent more than 99% by weight of the ingredients of the starting charge.

29. A method according to claim 28, in which the compounds providing the elements L, T, and M represent, together with the impurities, 100% of the ingredients of the starting charge.

30. A method according to claim 1, in which compounds providing the elements L, T, and M in the starting charge are selected from: SrO; $SrCO_3$; $La_2O_3$; CaO; $CaCO_3$; $Y_2O_3$; $Yb_2O_3$; MgO; $MgCO_3$; $CeO_2$; BaO; $MnO_2$; MnO; or $Mn_3O_4$.

31. A method according to claim 1, the molar proportions $l_d$, $t_d$, and $m_d$ of the elements L, T, and M respectively, in molar percentages based on the sum of the proportions $l_d$, $t_d$, and $m_d$, satisfying the following conditions:

$$k_1 \cdot (1-x) \cdot (1-y) \leq l_d/m_d \leq k_2 \cdot (1-x) \cdot (1-y) \quad (1)$$

and/or $$k_1 \cdot x \cdot (1-y) \leq t_d/m_d \leq k_2 \cdot x \cdot (1-y) \quad (2)$$

where $0<x\leq 0.5$ and $-0.1\leq y\leq 0.24$, $k_1$ being equal to 0.8, and $k_2$ being equal to 1.2.

32. A method according to claim 31, in which $k_1$ is equal to 0.9, and $k_2$ is equal to 1.1.

33. A method according to claim 1, in which, in step b'), an arc furnace is used when the fused product is in the form of a particle, or an induction furnace when the fused product is a block.

34. A method according to claim 1, in which the fused product is annealed.

35. A method according to claim 34, in which annealing is performed with a soak temperature lying in the range 1050° C. to 1400° C. for a soak duration at that temperature of at least 30 minutes, the soak beginning, when the fused product is in the form of a block, once all of the fused product has reached the soak temperature.

36. A method according to claim 34, in which annealing is performed under an atmosphere containing at least 20% by volume of oxygen.

37. A method according to claim 1, in which step c') comprises the following steps:
$c_1$') dispersing the molten liquid in the form of liquid droplets; and
$d_1$') solidifying the liquid droplets by contact with an oxygenated fluid, so as to obtain fused particles.

38. A method according to claim 37, in which, in step $c_1$'), said molten liquid is put into contact with an oxygenated fluid.

39. A method according to claim 37, in which, in step $c_1'$) and/or step $d_1'$), said molten liquid is put into contact with an oxygenated fluid containing at least 20% by volume of oxygen.

40. A method according to claim 37, in which the dispersion and solidification steps are simultaneous.

41. A method according to claim 37, in which contact is maintained between the droplets and an oxygenated fluid until said droplets have solidified completely.

42. A method according to claim 1, in which step c') comprises the following steps:
- $c_2'$) casting the molten liquid into a mold;
- $d_2'$) solidifying the liquid cast into the mold by cooling to obtain a block that is solidified at least in part; and
- $e_2'$) unmolding the block.

43. A method according to claim 42, in which, in step $c_2'$) and/or in step $d_2'$) and/or after step $e_2'$), said molten liquid that is solidifying is put directly or indirectly into contact with an oxygenated fluid.

44. A method according to claim 43, in which the oxygenated fluid is a gas.

45. A method according to claim 44, in which the oxygenated fluid is air.

46. A method according to claim 43, in which said contact is initiated immediately after unmolding the block.

47. A method according to claim 43, in which said contact is maintained until the block has solidified completely.

48. A method according to claim 42, in which the unmolding of step $e_2'$) is performed before the block has solidified completely.

49. A method according to claim 42, in which the block is unmolded as soon as it presents sufficient rigidity substantially to conserve its shape.

50. A method according to claim 42, in which the rate of cooling of the molten liquid during solidification is always less than 1000 K/s.

51. A method of fabrication according to claim 42, in which the block obtained at the end of step c'), optionally after annealing, is broken into pieces or powder.

52. A method according to claim 1, wherein at step b') fusing is performed with an arc furnace or an induction furnace.

* * * * *